(12) United States Patent
Satoh et al.

(10) Patent No.: US 7,013,748 B2
(45) Date of Patent: Mar. 21, 2006

(54) AUTOMATIC TRANSMISSION APPARATUS FOR VEHICLE

(75) Inventors: Takeshi Satoh, Sano (JP); Toshio Ohashi, Sano (JP); Takeshi Ogasawara, Sano (JP); Toyotoshi Katou, Yokohama (JP)

(73) Assignee: Calsonic Kansei Corporation, Tokyo (JP)

( * ) Notice: Subject to any disclaimer, the term of this patent is extended or adjusted under 35 U.S.C. 154(b) by 151 days.

(21) Appl. No.: 10/350,359

(22) Filed: Jan. 24, 2003

(65) Prior Publication Data

US 2004/0016314 A1    Jan. 29, 2004

(30) Foreign Application Priority Data

Feb. 8, 2002  (JP)  ............................. 2002-033037
Jun. 7, 2002  (JP)  ............................. 2002-167371

(51) Int. Cl.
*B60K 17/04*    (2006.01)
(52) U.S. Cl. .................................. 74/473.12; 74/473.3
(58) Field of Classification Search .............. 74/473.3, 74/473.12, 388 R
See application file for complete search history.

(56) References Cited

U.S. PATENT DOCUMENTS

| | | | | |
|---|---|---|---|---|
| 3,603,167 A | * | 9/1971 | Arce | 74/388 R |
| 3,686,967 A | * | 8/1972 | Beneke | 74/388 R |
| 4,483,682 A | * | 11/1984 | Cavil et al. | 440/53 |
| 4,531,419 A | * | 7/1985 | Botz et al. | 74/388 PS |
| 5,927,151 A | * | 7/1999 | Alber et al. | 74/473.3 |
| 5,967,252 A | * | 10/1999 | Saban et al. | 180/336 |
| 6,279,692 B1 | * | 8/2001 | Siepker et al. | 188/105 |
| 6,321,612 B1 | * | 11/2001 | Leimbach et al. | 74/335 |
| 6,378,393 B1 | * | 4/2002 | Bates | 74/473.18 |
| 6,484,598 B1 | * | 11/2002 | Peter | 74/335 |
| 2002/0020236 A1 | * | 2/2002 | Onodera | 74/335 |
| 2003/0188594 A1 | * | 10/2003 | Levin et al. | 74/473.12 |
| 2005/0056109 A1 | * | 3/2005 | Kim | 74/473.3 |

FOREIGN PATENT DOCUMENTS

JP        9-323559 A        12/1997

* cited by examiner

*Primary Examiner*—David Fenstermacher
(74) *Attorney, Agent, or Firm*—Foley & Lardner LLP

(57) ABSTRACT

An automatic transmission apparatus is provided with a compact shifting mechanism. The apparatus includes an automatic transmission, the shifting mechanism arranged inside the vehicle cabin to have a shift lever to be manipulated by a driver and also adapted to allow a desired driving range of the vehicle to be selected by the driver's manipulating of the shift lever, a link mechanism to transmit a movement of the shift lever to the shifting mechanism and a manipulating-force assisting device acting on a connecting part between the shifting mechanism and the link mechanism to assist a driver's force to manipulate the shift lever, the manipulating-force assisting device having a motor as a driving source.

5 Claims, 22 Drawing Sheets

AUTOMATIC TRANSMISSION APPARATUS FOR VEHICLE

BACKGROUND

The present invention relates to an automatic transmission apparatus for a vehicle. More particularly, it relates an automatic transmission apparatus that is equipped with a driving-range shifting mechanism for a vehicle.

FIGS. 1, 2A and 2B are views each showing an earlier automatic transmission apparatus for a vehicle. In FIG. 1, the automatic transmission apparatus 1 is provided with a shifting mechanism 3 for changing the operating condition of an automatic transmission 2 and a link mechanism 4. The shifting mechanism 3 is equipped with a shift lever (shift stick) 5 to be manipulated by a driver. When the driver manipulates the shift lever 5, the movement of the shift lever 5 is transmitted to the automatic transmission 2 through the link mechanism 4 to change a position of the driving range at the automatic transmission 2. Reference numeral 6 designates a top of a floor tunnel.

In order to transmit a driver's movement applied on the shift lever 5 to the automatic transmission 2 through the link mechanism 4 certainly, there is required a manipulating force to change the position of the driving range at the machine 2. In the earlier apparatus, the principle of lever is utilized to lighten a driver's burden (manipulating force) to operate the shift lever 5. In detail, the shift lever 5 is formed longer than a manual lever 2a provided in the automatic transmission 2, as shown in FIG. 1. Note, Japanese Patent Application Laid-Open No. 9-323559 discloses another automatic transmission apparatus utilizing the principle of the lever.

However, it should be noted that the above measure utilizing the principle of lever causes the shifting mechanism 3 including the shift lever 5 to be large-sized. Therefore, the automatic transmission apparatus 1 has a problem that the shifting mechanism 3 has to be arranged in a restricted area in a vehicle cabin laboriously. Further, the so-arranged shifting mechanism 3 has the shift lever 5 projecting from the floor tunnel top 6 upward remarkably, which might lose a beautiful sight in view of design.

SUMMARY

It is an object of the present invention to provide an automatic transmission apparatus that has a small-sized shifting mechanism while reducing a projection of a shift lever.

According to the present invention, the above-mentioned object is accomplished by an automatic transmission apparatus for a vehicle, which transmission apparatus includes, among other possible things: (a) an automatic transmission that has a driving-range changing mechanism; (b) a shifting mechanism that has a shift lever to be manipulated by a driver, the shifting mechanism being adapted to allow a driving range of the vehicle to be selected by the driver's manipulation of the shift lever; (c) a link mechanism for transmitting a movement of the shift lever to the driving-range changing mechanism; and (d) a manipulating-force assisting device that is configured to assist a driver's force to manipulate the shift lever by acting on a connecting part between the shifting mechanism and the link mechanism. The manipulating-force assisting device has a motor as a driving source.

Owing to the provision of the manipulating-force assisting device at the connecting part between the shifting mechanism and the link mechanism, it is possible to make the structure of the shifting mechanism compact.

Additionally, since the manipulating-force assisting device has a driving source formed by the motor, it is possible to alter the magnitude of an assisting force for assisting the driver's manipulation optionally.

Further, with the above-mentioned effects brought by the manipulating-force assisting device, it is possible to modify a length of the shift lever, its shape and a manipulating position of the shift lever.

According to a preferred embodiment of an automatic transmission apparatus, the shifting mechanism includes a selector casing for accommodating a part of the shift lever therein, the selector casing being provided with a fastening part in the form of a through-pipe extending in a fore-and-aft direction of the vehicle With the above formation of the fastened part of the selector casing, it becomes possible to communicate the through-pipe with a rear vent duct of an air-conditioning unit. Namely, it is possible to extend the rear vent duct up to the vicinity of a rear seat without changing the sectional shape of the rear vent duct of the air-conditioning unit.

Consequently, the configuration of the rear vent duct can be simplified to reduce the manufacturing cost of the apparatus. Additionally, as the ventilation resistance of the apparatus is reduced, it is possible to improve a quantity of wind and also possible to reduce a level of noise.

Further, the manipulating-force assisting device may further include a sensor part arranged in the shifting mechanism to detect information about the shift lever and a control unit arranged in the vehicle cabin to generate a drive signal to the motor on basis of the information detected the sensor part.

Then, since the sensor part is arranged in the shifting mechanism, it is possible to detect a load transmitted from the shift lever to a driver's hand, at a position close to the shift lever precisely.

Further, the shifting mechanism may have an output part associated with the manipulating-force assisting device and the driver's force to manipulating the shift lever is transmitted to the output part through a belt.

Owing to the adoption of the belt as transmitting means, it becomes possible to improve the operability of the shift lever in comparison with the adoption of gears. Additionally, the structure of the shifting mechanism can be simplified.

Further, the shifting mechanism may have an output part associated with the manipulating-force assisting device and the driver's force to manipulating the shift lever is transmitted to the output part through a rod.

Owing to the adoption of the rod as transmitting means, it becomes possible to improve the operability of the shift lever in comparison with the adoption of gears, as well. Additionally, the structure of the shifting mechanism can be simplified.

According to another aspect of the present invention, there is also provided an automatic transmission apparatus for a vehicle, which transmission apparatus includes, among other possible things: (a) an automatic transmission that has a driving-range changing mechanism; (b) a shifting mechanism that has a shift lever to be manipulated by a driver, the shifting mechanism being adapted to allow a driving range of the vehicle to be selected from a plurality of driving ranges by the driver's manipulation of the shift lever; (c) a link mechanism for transmitting a movement of the shift lever to the driving-range changing mechanism; (d) a load detecting unit for detecting a load in a manipulating-force transmitting direction to transmit a manipulation force, in a course of transmitting the manipulation force from the shift lever to the driving-range changing mechanism; (e) an assist-force generating unit for generating an assist force to increase the manipulation force in the course of transmitting the manipulation force; and (f) a control unit for controlling a magnitude of the assist force generated by the assist-force generating unit, corresponding to the load detected by the load detecting unit.

With the above-mentioned structure, the assist-force generating unit generates an assist force corresponding to the load detected by the load detecting unit. The assist force is combined with a driver's manual manipulating force on the shift lever and transmitted to the automatic transmission. Therefore, even if shortening a length of the shift lever, the manipulation of the shift lever neither gets heavier nor imposes a burden on the driver. Consequently, it becomes possible to increase the degree of freedom in arranging the shift lever. For example, the so-shortened shift lever may be arranged in an instrument panel.

In a preferred embodiment, the load detecting unit may be provided in the shift lever.

Then, a load applied on a driver's hand through the shift lever can be detected, at a position close to the shift lever, by the load detecting unit precisely.

Further, the assist-force generating unit may be arranged in the driving-range changing mechanism.

Then, an assist force generated by the assist-force generating unit acts on both the driving-range changing mechanism and the automatic transmission and does not act on the link mechanism. Thus, it is possible to prolong the durability of the link mechanism.

Further, the control unit controls the assist force generating unit so that an assist force generated in changing the driving range between neutral range (N) and forward driving range (D) becomes larger than an assist force generated in changing the driving range to other driving ranges.

Then, since the assist force between the neutral range (N) and the forward driving range (D) is increased to lighten a driver's manipulating force, the operability of the shift lever during the vehicle's travelling can be improved.

Further, the assist-force generating unit may includes an inhibitor switch that detects a driving range selected by a driver to output a signal corresponding to the driving range selected.

Then, since the inhibitor switch is arranged inside the assist-force generating unit, an inhibitor switch that has been attached as another component becomes useless to reduce the manufacturing cost of the automatic transmission apparatus.

Further, when the load detecting unit detects a load in the opposite direction of the manipulating-force transmitting direction, the control unit allows the load detecting unit to stop detection of a load temporarily until the present driving range is changed to the other driving range.

Thus, there is no possibility that the assist-force generating unit generates an assist force in the opposite direction, thereby providing the driver with no feeling of brake in manipulating the shift lever.

Further, when a rise rate (rising amount/time) of the load detected by the load detecting unit is smaller than a predetermined rate, the control unit allows the assist-force generating unit to continue to generate a predetermined assist force until the present driving range is changed to the other driving range.

Then, it is possible to prevent an occurrence of chattering where the assist-force generating unit operates intermittently.

Further, at the beginning of manipulating the shift lever from each driving range, the control unit allows the assist-force generating unit to generate an assist force while increasing the assist force gradually.

Consequently, it is possible to avoid a sudden stop of the assist-force generating unit, which might be caused since an assist force by the unit has reached a requested load immediately, at the beginning of manipulating the shift lever.

Further, after the load detecting unit has been powered on or powered off, the control unit prohibits the generation of the assist force by the assist-force generating unit until the outputs of the load detecting unit are stabilized.

Therefore, it is possible to avoid the glitch of the assist-force generating unit under condition that the load detecting unit outputs unstably.

According to an embodiment of the invention, the assist-force generating unit generates a designated assist force predetermined in accordance with which of the driving ranges the shift lever does occupy.

It is possible to establish a manipulating force on the shift lever for every position of the driving ranges, optionally.

Further, the assist-force generating unit generates a predetermined assist force in accordance with a direction to which the shift lever is manipulated.

It is possible to establish a manipulating force in manipulating the shift lever from a designated driving range and also a manipulating force in manipulating the shift lever to a designated driving range, optionally.

Further, the control unit may be provided with a gradient detecting unit for detecting an inclination angle of the vehicle and the assist-force generating unit generates a predetermined assist force in accordance with the inclination angle of the vehicle.

It is possible to establish a manipulating force on the shift lever optionally.

Further, the assist-force generating unit generates a predetermined assist force in accordance with a condition of the vehicle at a parking range (P) in the driving ranges.

It is possible to establish a manipulating force in manipulating the shift lever from the parking range (P) optionally.

Further, the automatic transmission apparatus may further include: (a) a forward driving range (D) that includes an automatic transmission mode to attain a predetermined gear-speed corresponding to the traveling condition of the vehicle and a manual transmission mode that allows an optional gear-speed to be selected; (b) a mode switching mechanism for switching a transmission mode between the manual transmission mode and the automatic transmission mode by a driver's manipulation of the shift lever; and (c) a manual transmission mode detecting unit for detecting the transmission mode switched to the manual transmission mode. When a switch from the transmission mode to the manual transmission mode is detected by the manual transmission mode detecting unit, the control unit prohibits the generation of the assist force by the assist-force generating unit.

In the above apparatus, when the manual transmission mode detecting unit detects the transmission mode switched to the manual transmission mode, the control unit prohibits the generation of the assist force by the assist-force generating unit. Therefore, it is possible to prevent the assist-force generating unit from operating by mistake.

The above and other features and advantages of this invention will become apparent, and the invention itself will best be understood, from a study of the following description and appended claims, with reference had to the attached drawings showing preferred embodiments of the invention.

DESCRIPTION OF THE PREFERRED EMBODIMENT

Now referring to accompanying drawings, various embodiments of the present invention will be described below.

Figure 3:
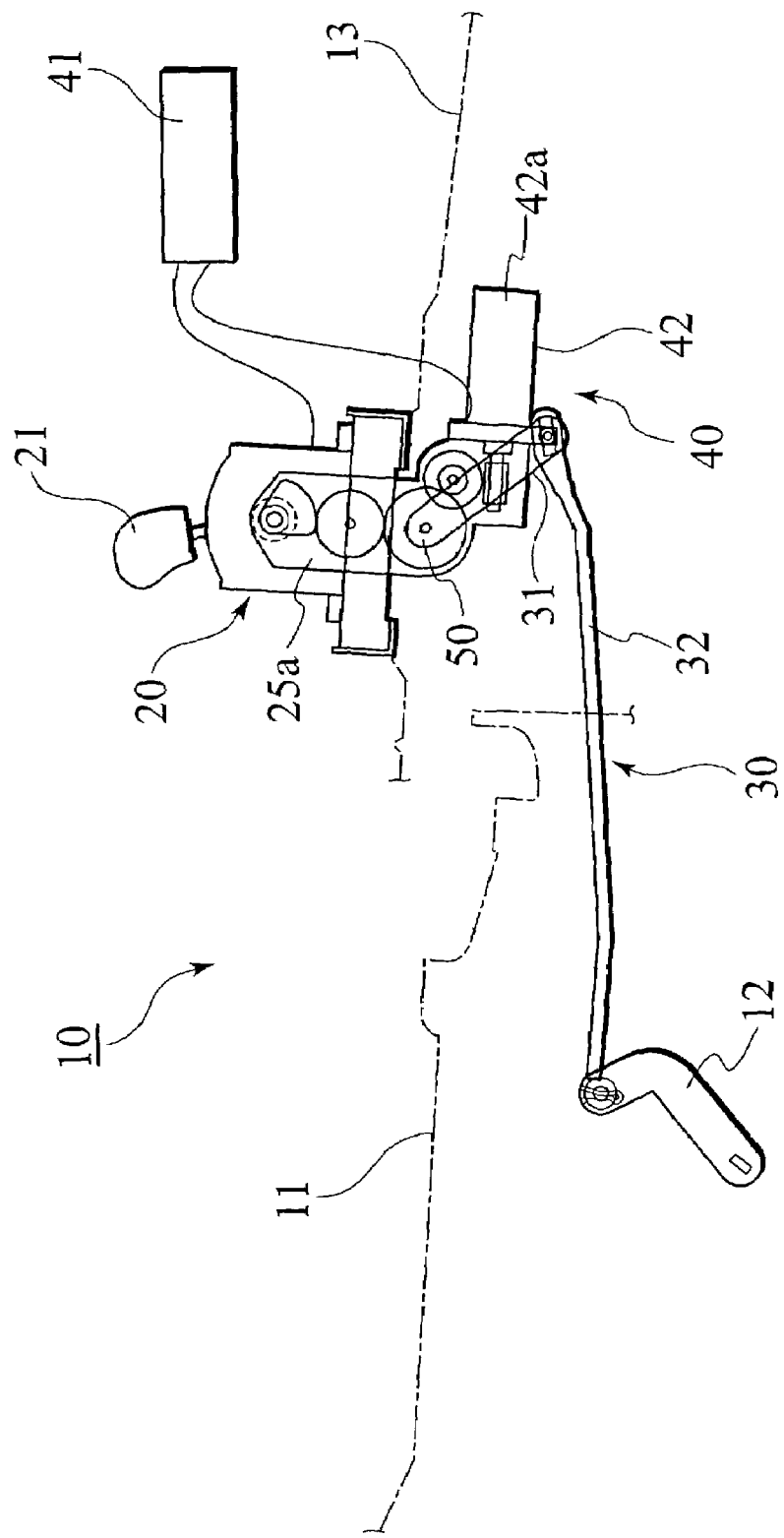
FIG. 3 is a side view of an automatic transmission apparatus in accordance with a first embodiment of the invention.

FIG. 3 is a structural view of an arrangement where an automatic transmission apparatus 10 of the first embodiment is attached to a vehicle body. The automatic transmission apparatus 10 includes: (a) an automatic transmission 11, (b) a shifting mechanism 20 that is arranged outside a vehicle cabin to have a shift lever 21 to be manipulated by a driver, (c) a link mechanism 30 that is arranged outside the vehicle cabin to transmit movements of the shift lever 21 to the automatic transmission 11; and (d) a manipulating-force assisting device 40 that is arranged in a linking part 50 between the shifting mechanism 20 and the link mechanism 30 to have an electric motor as a driving source.

The automatic transmission 11 transmit transmits a driving force of an engine and its rotations to wheels, which force corresponds to a shift range (driving range) that is designated by a driver and a traveling situation of the vehicle.

Figure 4A:
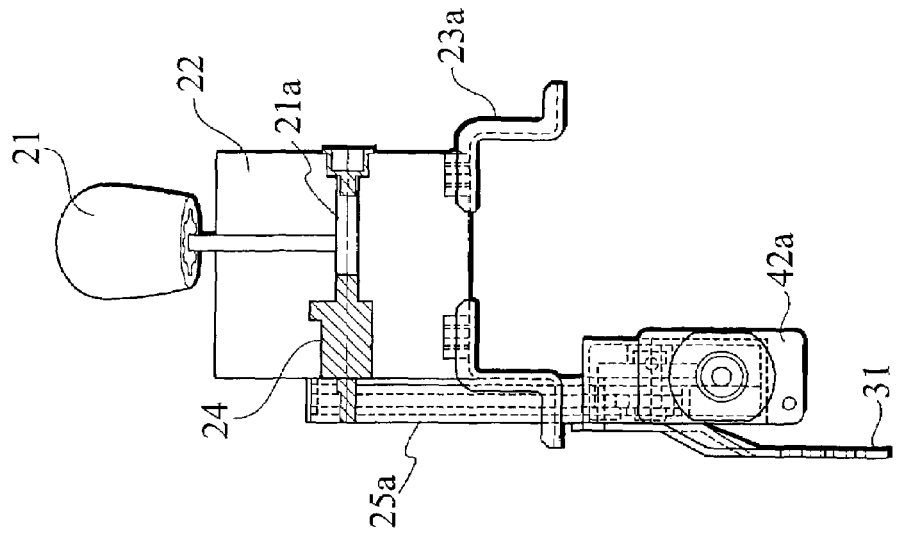
FIG. 4A is a side view of the automatic transmission apparatus of FIG. 3

As shown in FIG. 3 and FIG. 4A, the shifting mechanism 20 is formed by: (a) the shift lever 21, which allows the shift range to be selected, (b) a selector casing 22 for accommodating the shift lever 21, (c) a fastening part 23a that is formed in one body with the selector casing 22 to fix the mechanism 20 to the vehicle body, and (d) an output part 25a for generating the movements of the shift lever 21.

The shifting mechanism 20 includes a part that is positioned inside the vehicle cabin (i.e., above a floor tunnel top 13) and another part that is positioned outside the vehicle cabin (i.e., below the top 13). In the so-constructed mechanism 20, the shift lever 21 is born by the selector casing 22 through a selector rod 21a.

The output part 25a is formed by a gear assembly that includes: (a) a first output gear 27a, (b) a second output gear 27b meshing that meshes with the first output gear 27a, and (c) a selector output member 26a, which is in the form of a gear that meshes with the second output gear 27b. As shown in FIG. 4A, the first output gear 27a is fixed to one end of the selector rod 21. Thus, the shift lever 21 is associated with the output part 25a.

The movements of the shift lever 21 are transmitted to the selector rod 21a, thereby converting such straight movements on the lever 21 into rotational motions about the rod 21a. With the engagement among these gears 27a, 27b and 26a, the rotational movements are transmitted from the first output gear 27a to the selector output member (gear) 26a through the second output gear 27b and finally generated from the shifting mechanism 20.

The link mechanism 30 is provided to transmit the rotational movement of the selector output gear 26a to the automatic transmission 11 and is formed by a link structure, as shown in FIG. 3.

The link mechanism 30 has a lower lever 31 in the form of a rectangular plate, as an input part. The lower lever 31 has one end fastened to the selector output gear 26a at the linking part 50 (also called a connecting part) and the other end pivotally connected to an end of a transmission rod 32. The other end of the transmission rod 32 is pivoted to a manual lever 12 connected with a driving-range changing mechanism of the automatic transmission 11.

The rotational movements of the selector output gear 26a are transmitted to the lower lever 31, in the form of its pivotal movements. The pivotal movements of the lower lever 31 are converted to reciprocating movements of the transmission rod 32. Then, the reciprocating movements of the transmission rod 32 is transmitted to the driving-range changing part of the automatic transmission 11 through the manual lever 12.

Figure 4B:
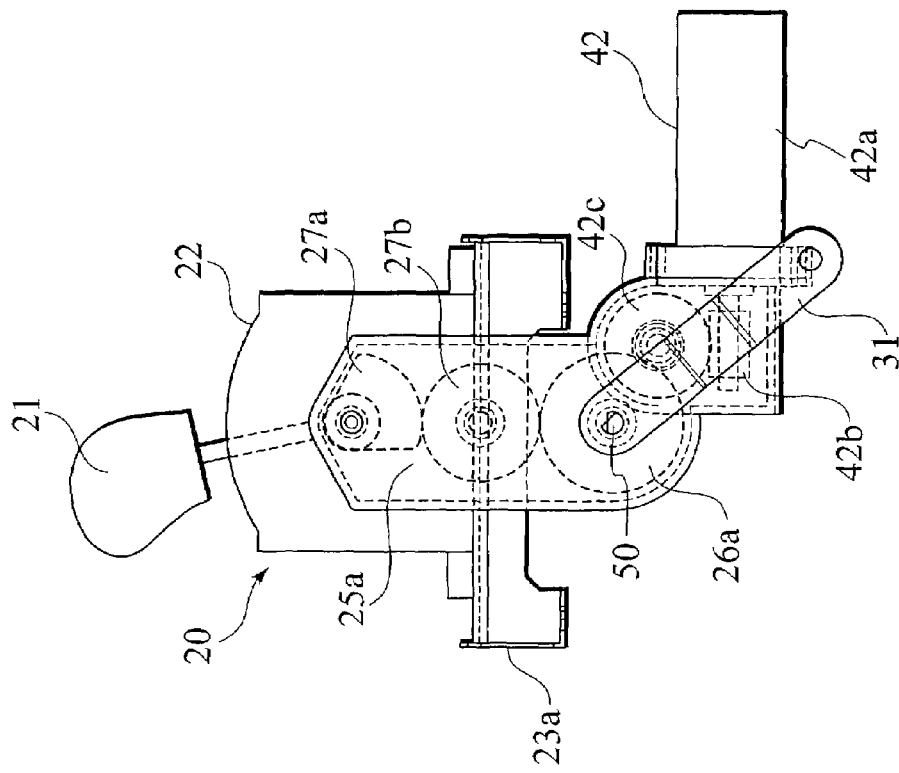
FIG. 4B is a rear view of FIG. 4A.

The manipulating-force assisting device 40 is provided to assist a driver's force to manipulating the shift lever 21, as shown in FIGS. 4A and 4B. The manipulating-force assisting device 40 includes: (a) a driving part 42, (b) a sensor part 24, and (c) a control unit 41, all of which are electrically connected with each other.

The driving part 42 is positioned outside the vehicle cabin. The driving part 42 includes a motor 42a as a driving source. The motor 42a has a rotating shaft fastened to a first motor gear 42b. The first motor gear 42b is engaged with a second motor gear 42c. The second motor gear 42c meshes with the above connecting part 50.

When the motor 42a is driven, the first motor gear 42b rotates. Consequently, the second motor gear 42c is rotated to transmit the driving force of the motor 42a to the connecting part 50, as a force to assist the driver's manipulating force.

The sensor part 24 is built in the selector rod 21a of the shifting mechanism 20 to detect the position of the shift lever 21, a manipulation-force applied thereon, a manipulation amount of the lever 21, a manipulation direction of the lever 21, etc.

The control unit 41 is arranged in the vehicle cabin to input the above information generated from the sensor part 24 and output command signals corresponding to the information to the driving part 42, thereby controlling the driving force of the motor 42a.

On a detection of the movements of the shift lever 21 by the sensor part 24, the control unit 41 calculates a necessary assisting driving force, voltage and current required for the motor 42a to attain the calculated assisting driving force. Then, the so-calculated voltage and current are applied to the motor 42a. With this drive of the motor 42a, the assisting driving force is transmitted to the connecting part 50 through the first motor gear 42b and the second motor gear 42c, whereby the driver's manipulating force can be reduced.

According to the above-mentioned embodiment, since the automatic transmission apparatus 10 is provided, at the connecting part 50 between the shifting mechanism 20 and the link mechanism 30, with the manipulating-force assisting device 40, it is possible to make the shifting mechanism 20 on the floor tunnel top 13 compact.

Consequently, the degree of freedom in mounting the selector casing 22 is increased to realize various decorative forms, for example, an interior decoration having great importance to comfort in the vehicle cabin, an interior decoration having great importance to operability of the shift lever 21, etc.

Additionally, in the manipulating-force assisting device 40 of this embodiment, the magnitude of the assisting driving force can be changed owing to the adoption of the motor 42a as the driving source. Therefore, it is also possible to alter the driver's manipulating force for every driving range at the shifting mechanism 20. For instance, at both ranges of parking (P) and reverse (R), it may be carried out to reduce an assisting force by the device 40 thereby establishing a driver's manipulating force to be somewhat heavy. On the other hand, at the other driving ranges, the assisting force by the device 40 may be increased to lighten the driver's manipulating force. In this way, it is possible to improve the manipulation feeling of the shift lever 21.

Further, owing to the miniaturization of the shifting mechanism 20 and the changeable magnitude of the assisting force, it is possible to modify the length of the shift lever, its shape and its manipulating position in accordance with a driver's stamina and exercise ability.

Since the manipulating-force assisting device 40 is arranged at the connecting part 50 between the shifting mechanism 20 and the link mechanism 30, even if the same device 40 has a malfunction, it is possible to ensure the change of driving ranges by manipulating the shift lever 21, thereby avoiding traveling inability of vehicle.

Further, due to the arrangement of the motor 42a outside the vehicle cabin, it is possible to prevent the operational noise of the motor 42a from spreading into the vehicle cabin.

Figure 5:
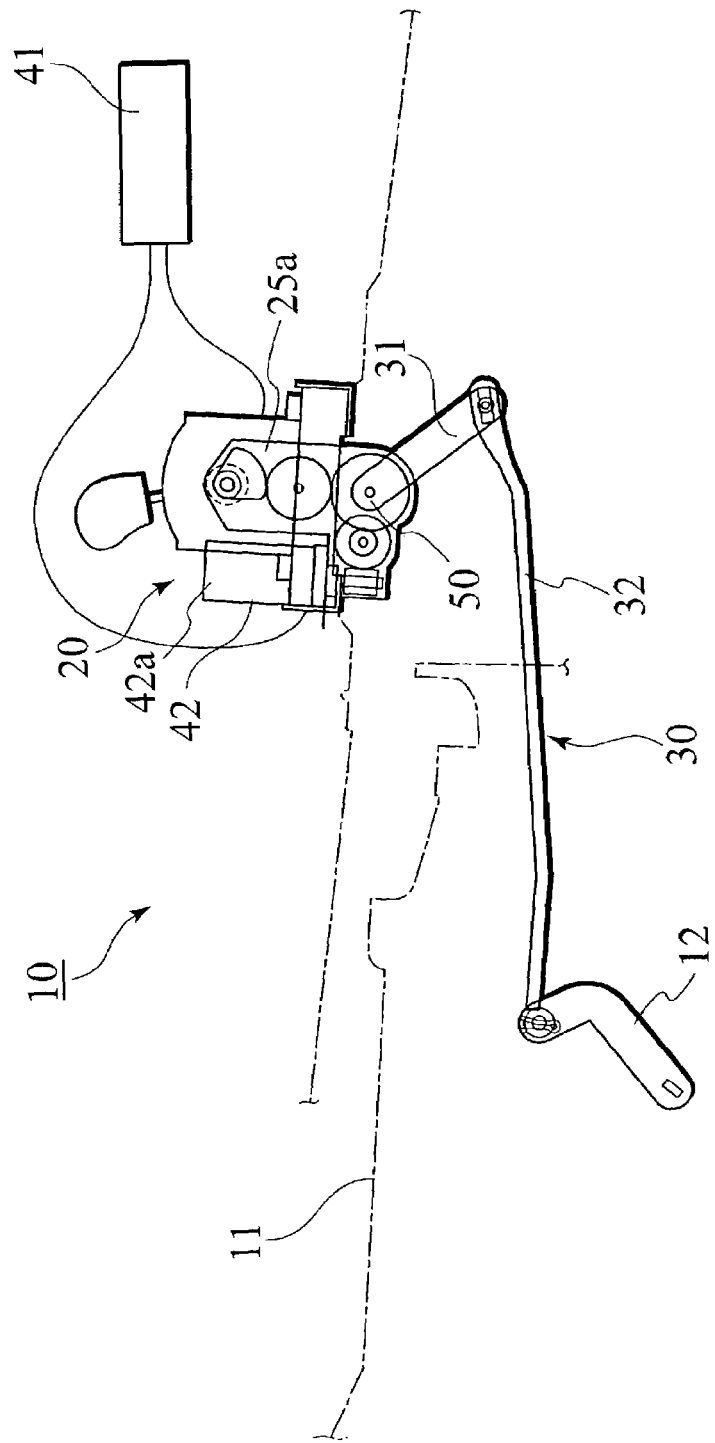
FIG. 5 is a side view of an automatic transmission apparatus in accordance with a second embodiment of the invention.
Figure 6:
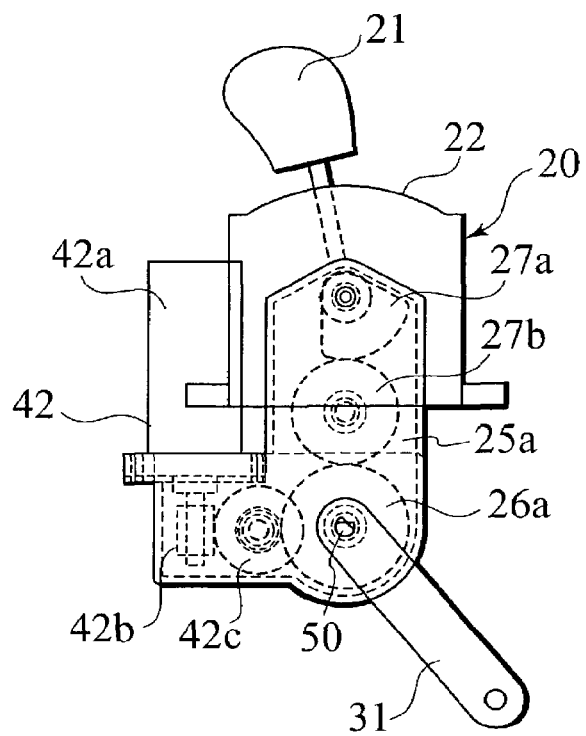
FIG. 6 is a side view of the automatic transmission apparatus of FIG. 5.

FIGS. 5 and 6 show the second embodiment of the invention. In the second embodiment, elements similar to those of the first embodiment are indicated with the same reference numerals, respectively. Different from the first embodiment, the motor 42a is arranged in the vehicle cabin (above the floor tunnel top). The other constituents are similar to those of the first embodiment and therefore, their overlapping descriptions are eliminated.

As for this arrangement, it should be noted that the floor tunnel top 13 is subjected to radiant heat from an engine room, exhaust pipes under condition that any wind does not flow on the backside of the vehicle body (e.g. traffic jam, idling stop). Nevertheless, according to this embodiment, since the motor 42a is arranged in the vehicle cabin, it is possible to prevent the motor 42a from being exposed to circumstances of high temperature. In other words, according to the embodiment, there is no need to employ an expensive motor having heat-resistant parts, whereby the manufacturing cost of the device 40 can be saved.

Figure 7:
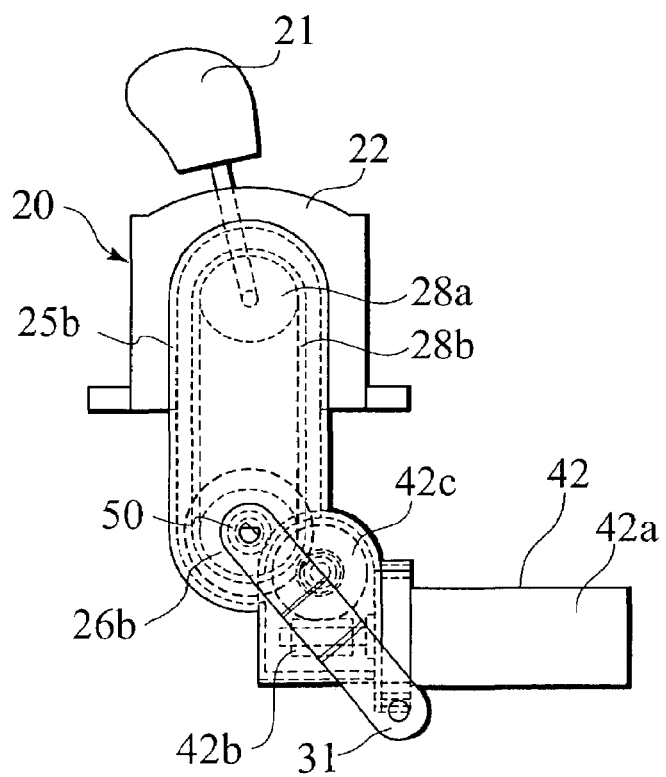
FIG. 7 is a side view of an automatic transmission apparatus in accordance with a third embodiment of the invention.

FIG. 7 shows the third embodiment of the invention. Also in this embodiment, elements similar to those of the first embodiment are indicated with the same reference numerals, respectively. The third embodiment differs from the first embodiment in the structure of an output part 25b of the shifting mechanism 20. The other constituents are similar to those of the first embodiment and therefore, their overlapping descriptions are eliminated.

According to the embodiment, the output part 25b is formed by a transmission structure having a belt 28b. In the transmission structure, a disc-shaped output pulley 28a has its center fastened to the selector rod 21a thereby forming an input part of the output part 25b. While, a selector output member 26b in the form of a disc-shaped pulley is arranged to oppose the output pulley 28a. The selector output member (pulley) 26b has its center fastened to the connecting part 50. The selector output pulley 26b is associated with the output pulley 28a through the intermediary of the above belt 28b.

Owing to the adoption of transmitting means in the form of belt, it is possible to cancel a feeling of manipulation peculiar to a gear engagement, thereby improving a driver's feeling to manipulate the shift lever 21.

Figure 8:
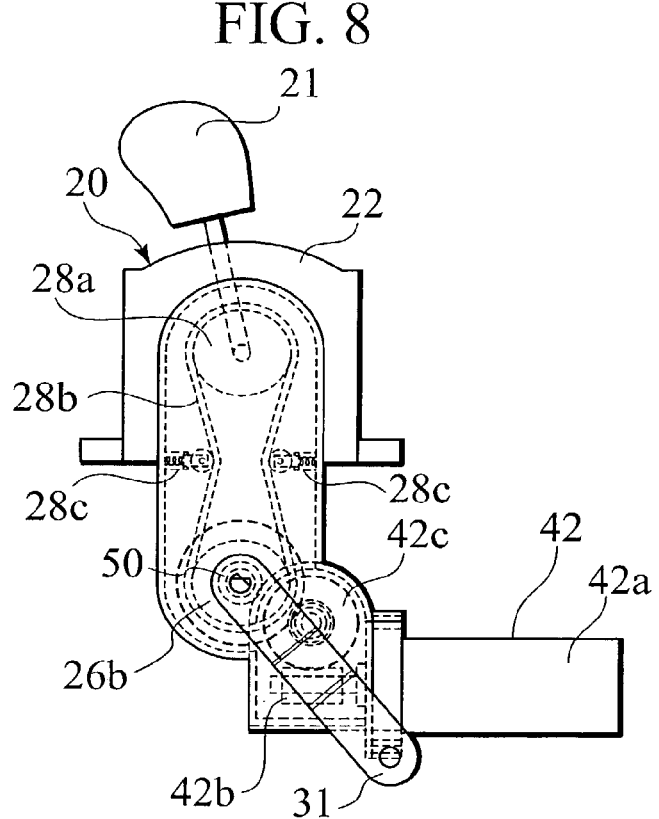
FIG. 8 is a side view of an automatic transmission apparatus in accordance with a fourth embodiment of the invention.

FIG. 8 shows the fourth embodiment of the invention.

The fourth embodiment differs from the third embodiment in that the shifting mechanism 20 is provided, at an output part 25c thereof, with tensioners 28c for adjusting a tension of the belt 28b. Consequently, even if the using of the shifting mechanism 20 for a long period causes the belt 28b to be expanded, the tensioners 28c serve to maintain a constant tension of the belt 28b. That is, since the adjustment operation of the belt 28b becomes needless, it is possible to improve the capability of the apparatus in terms of maintenance.

Figure 9:
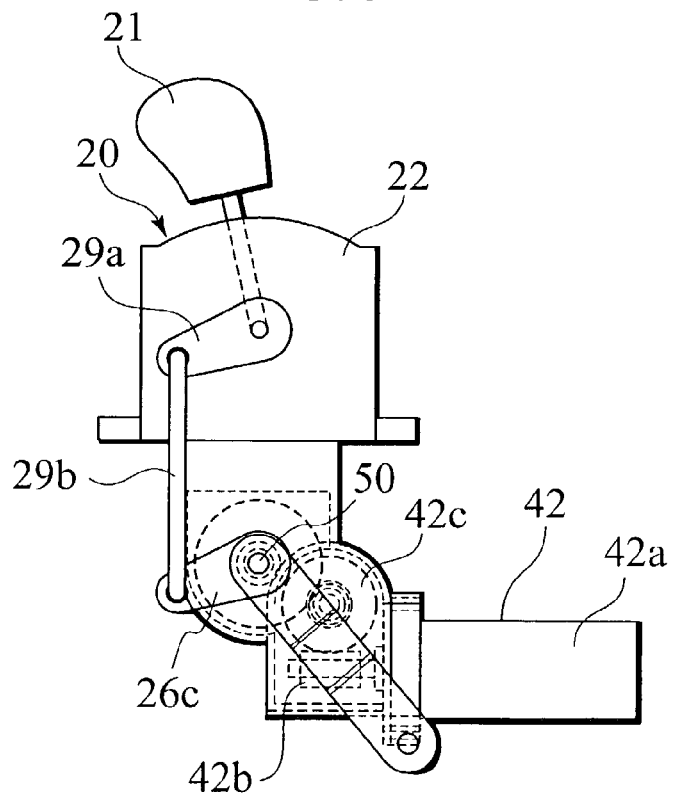
FIG. 9 is a side view of an automatic transmission apparatus in accordance with a fifth embodiment of the invention.

FIG. 9 shows the fifth embodiment of the invention. Also in this embodiment, elements similar to those of the first embodiment are indicated with the same reference numerals, respectively. The fifth embodiment differs from the first embodiment in the structure of an output part 25d of the shifting mechanism 20. The other constituents are similar to those of the first embodiment and therefore, their overlapping descriptions are eliminated.

According to the fifth embodiment, the output part 25d is formed by a transmission structure having a link mechanism with a rod 29b. In the transmission structure, an output member 29a in the form of a substantial oval plate has its one end fastened to the selector rod 21a thereby forming an input part of the output part 25b. While, a selector output member 26c in the form of a substantial oval plate is arranged to oppose the output member 29a. The selector output member 26c has its one end fastened to the connecting part 50. The selector output member 26c is connected with the output member 29a through the intermediary of the above rod 29b. In detail, the rod 29b has its one end rotatably connected with the output member 29a and the other end rotatably connected with the selector output member 26c.

Owing to the adoption of transmitting means in the form of rod, it is possible to cancel a feeling of manipulation peculiar to a gear engagement, thereby improving a driver's feeling to manipulate the shift lever 21.

Further, since the profiles of the respective members 29a, 29b and 26c forming the output part 25d are simplified, it is possible to reduce the manufacturing cost of the automatic transmission apparatus.

Figure 10A:
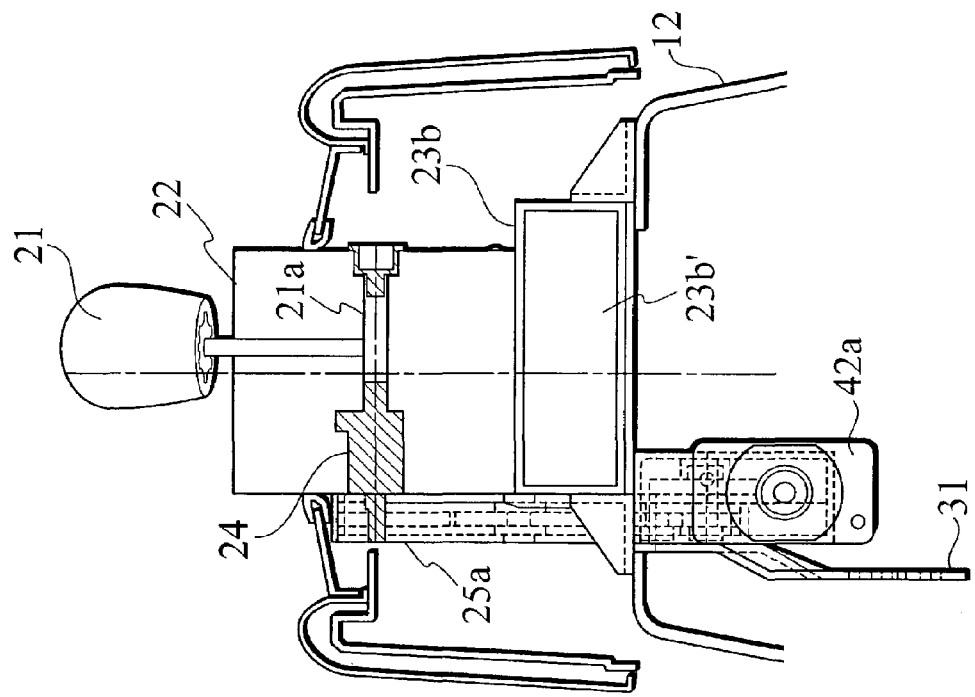
FIG. 10A is a side view of an automatic transmission apparatus in accordance with a sixth embodiment of the invention of FIG. 3
Figure 10B:
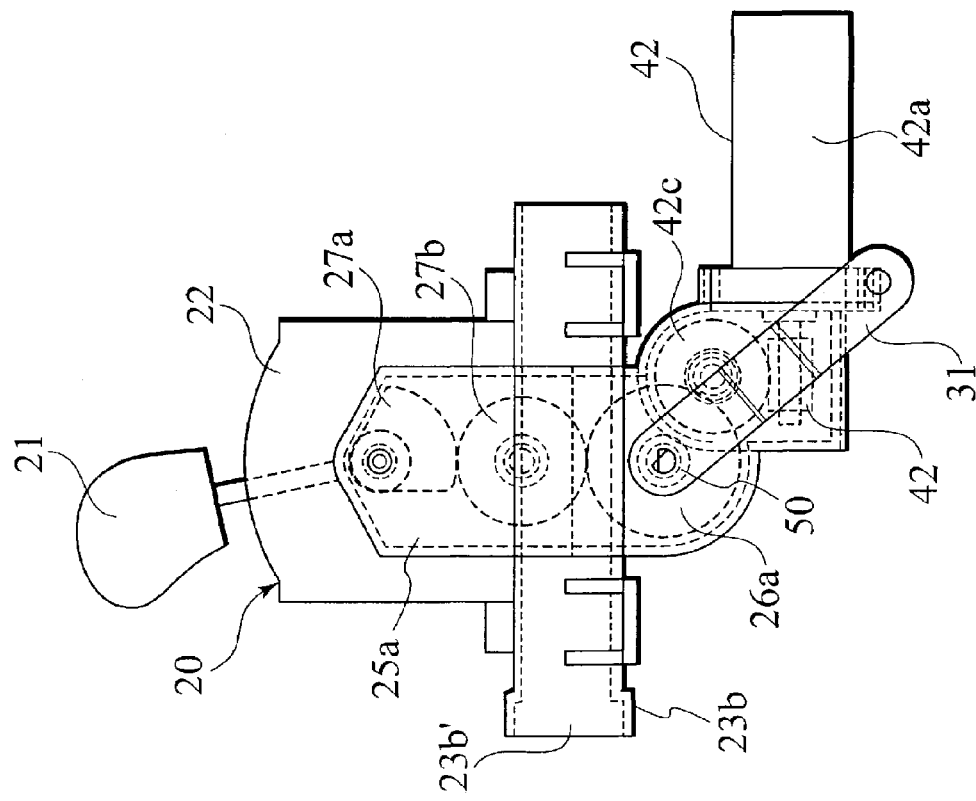
FIG. 10B is a rear view of FIG. 10A.

FIGS. 10A and 10B are views showing the sixth embodiment of the invention. Also in this embodiment, elements similar to those of the first embodiment are indicated with the same reference numerals, respectively. The sixth embodiment differs from the first embodiment in the shape of a fastening part 23b of the shifting mechanism 20. The other constituents are similar to those of the first embodiment and therefore, their overlapping descriptions are eliminated.

According to this embodiment, the fastening part 23b is formed by a through-pipe 23b extending in a fore-and-aft direction of the vehicle. The through-pipe 23b is communicated with a not-shown rear vent duct of an air-conditioning unit (also not shown).

Figure 1:
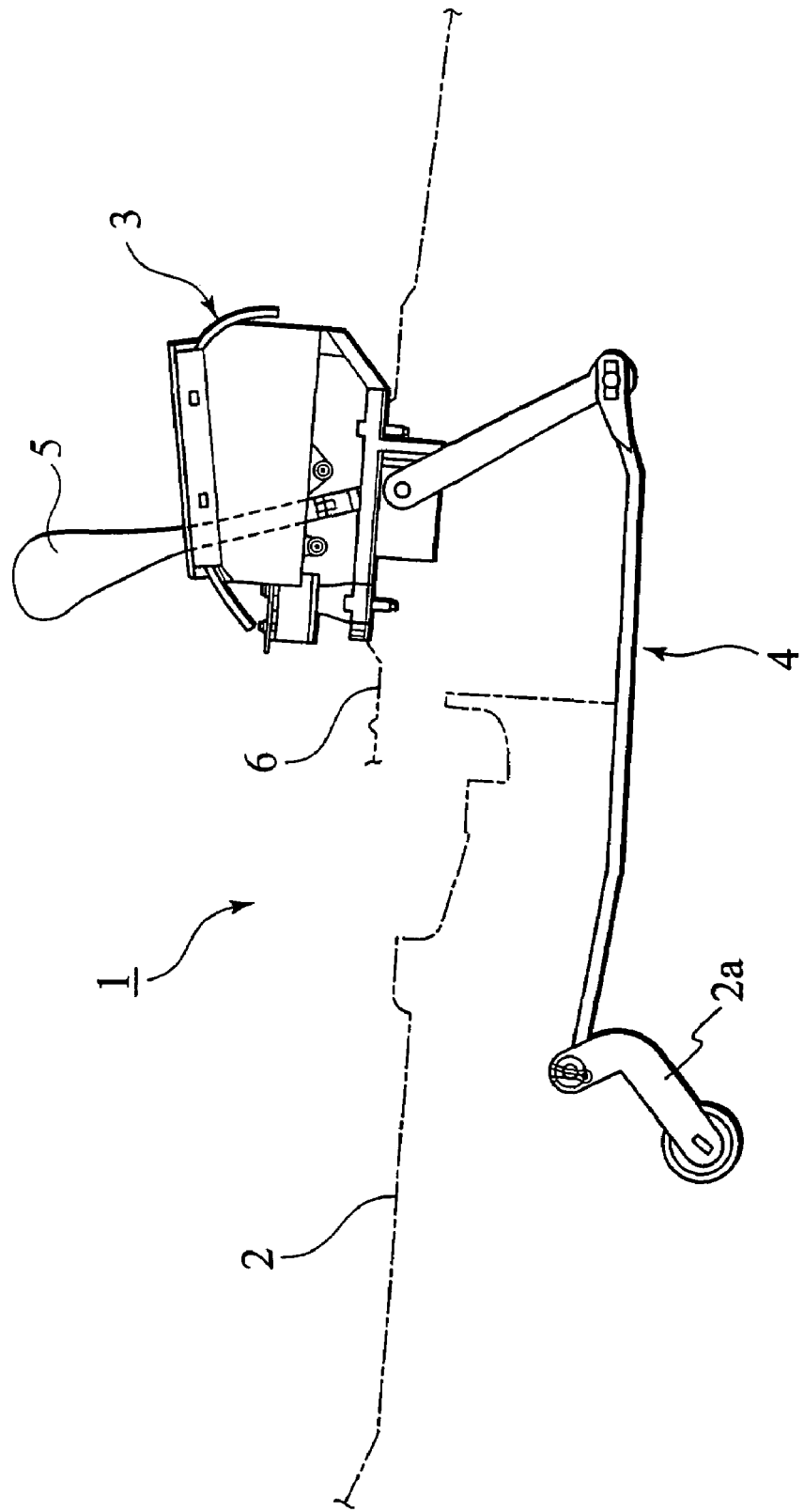
FIG. 1 is a side view of an earlier automatic transmission apparatus.
Figure 2A:
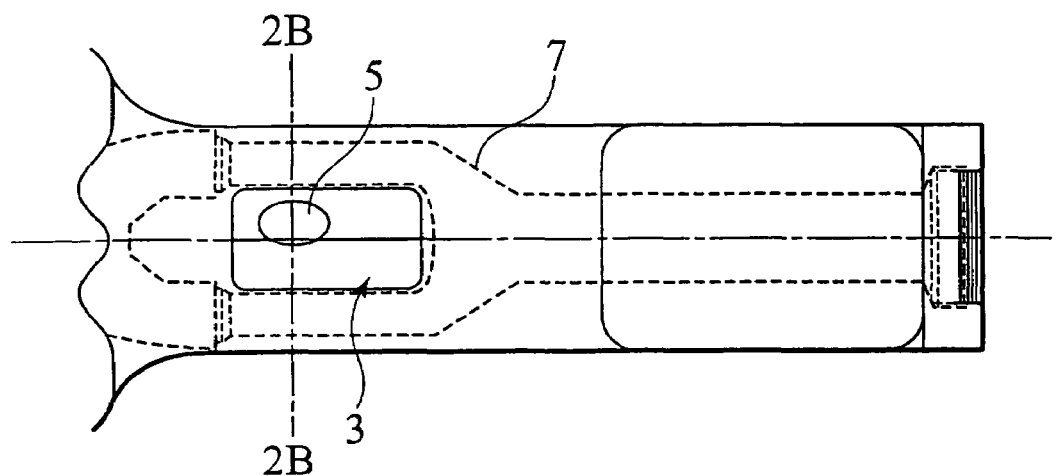
FIG. 2A is a top view of FIG. 1
Figure 2B:
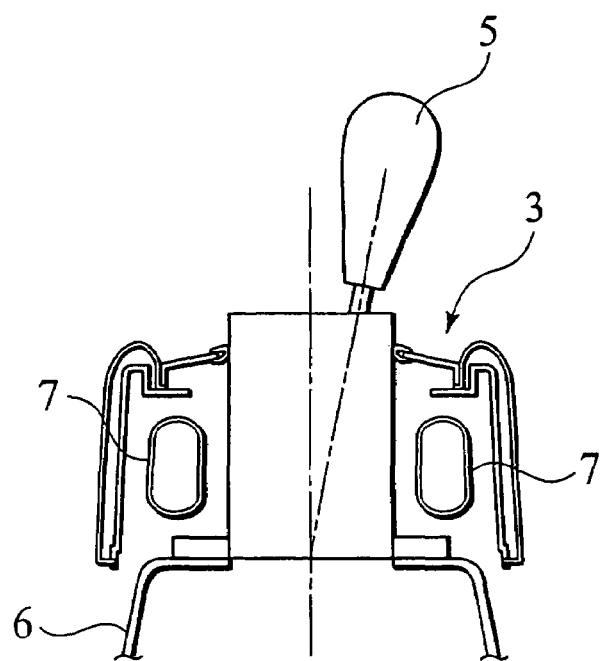
FIG. 2B is a sectional view taken along a line 2B—2B of FIG. 2A.

The feature of the embodiment will be described with reference to FIGS. 2A and 2B showing the earlier apparatus.

As shown in FIGS. 2A and 2B, the automatic transmission apparatus is provided, on the side of the vehicle cabin, with a rear bent duct 7 extending along a floor tunnel top 6. Extending from an air-conditioning unit (not shown) on the front side of the vehicle cabin, the rear bent duct 7 is divided, in front of the shifting mechanism 3, into two pieces since the same mechanism 3 occupies a space above the floor tunnel top 3 greatly. Passing through both sides of the shifting mechanism 3, the so-divided duct pieces are gathered to form the rear bent duct 7 again, extending to the side of a rear seat (not shown). In this way, the earlier automatic transmission apparatus has problems that the shape of the rear bent duct 7 is so complicated as to increase the manufacturing cost of the apparatus and also the ventilation resistance of "air-conditioner" wind.

To the contrary, since the automatic transmission apparatus of this embodiment includes the shift lever 21 having a shortened length and the shifting mechanism 20 having a miniaturized size, the fastening part 23b is provided with the through-pipe 23b mentioned above. Thus, it is possible to extend the rear vent duct of the air-conditioning unit up to the vicinity of a rear seat of the vehicle without changing the sectional shape of the rear vent duct extending from the air-conditioning unit.

Consequently, the configuration of the rear vent duct can be simplified to reduce the manufacturing cost of the apparatus. Additionally, as the ventilation resistance of the apparatus is reduced, it is possible to improve a quantity of wind and also possible to reduce a level of noise.

Figure 11:
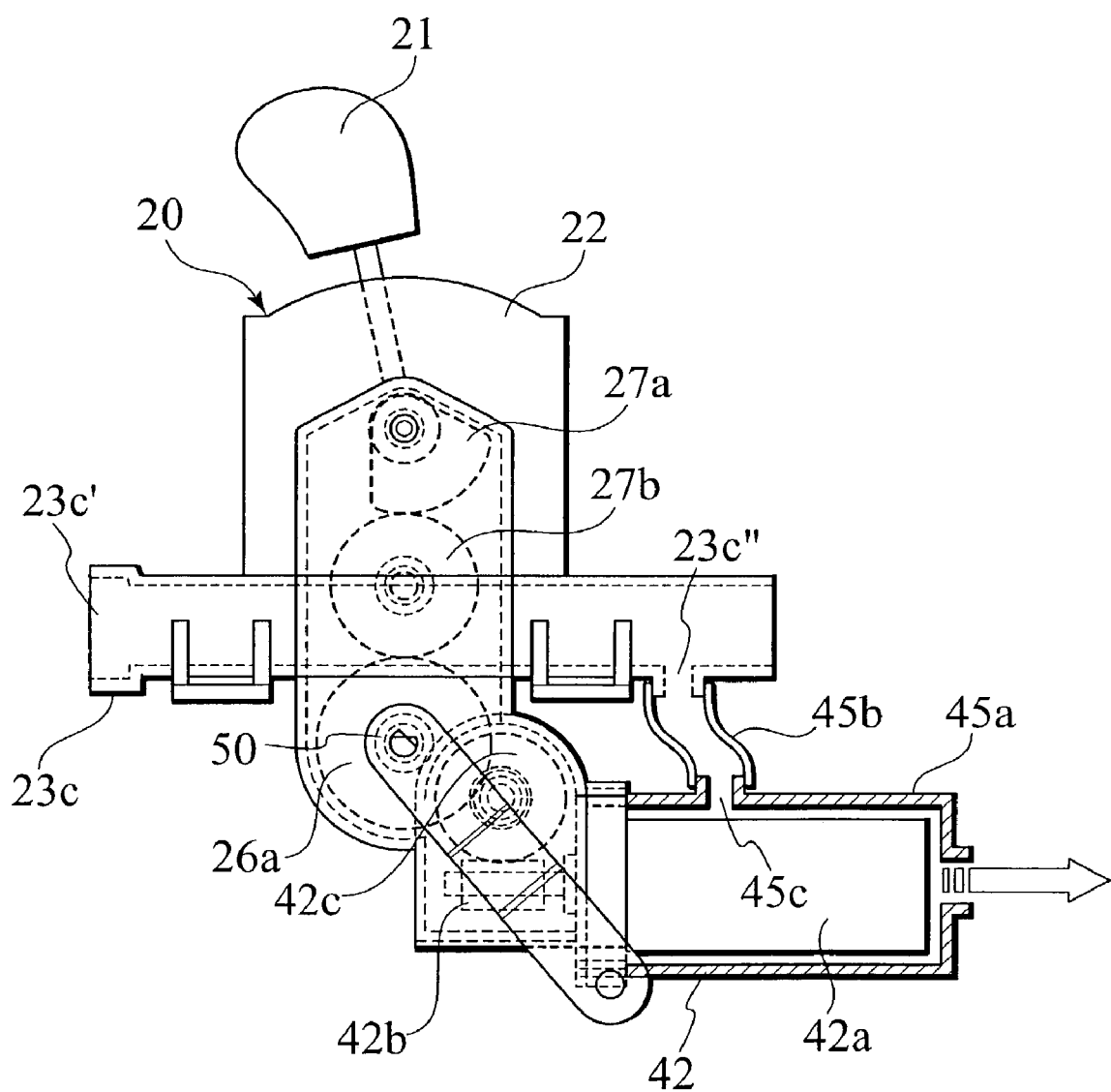
FIG. 11 is a side view of an automatic transmission apparatus in accordance with a seventh embodiment of the invention.
Figure 12:
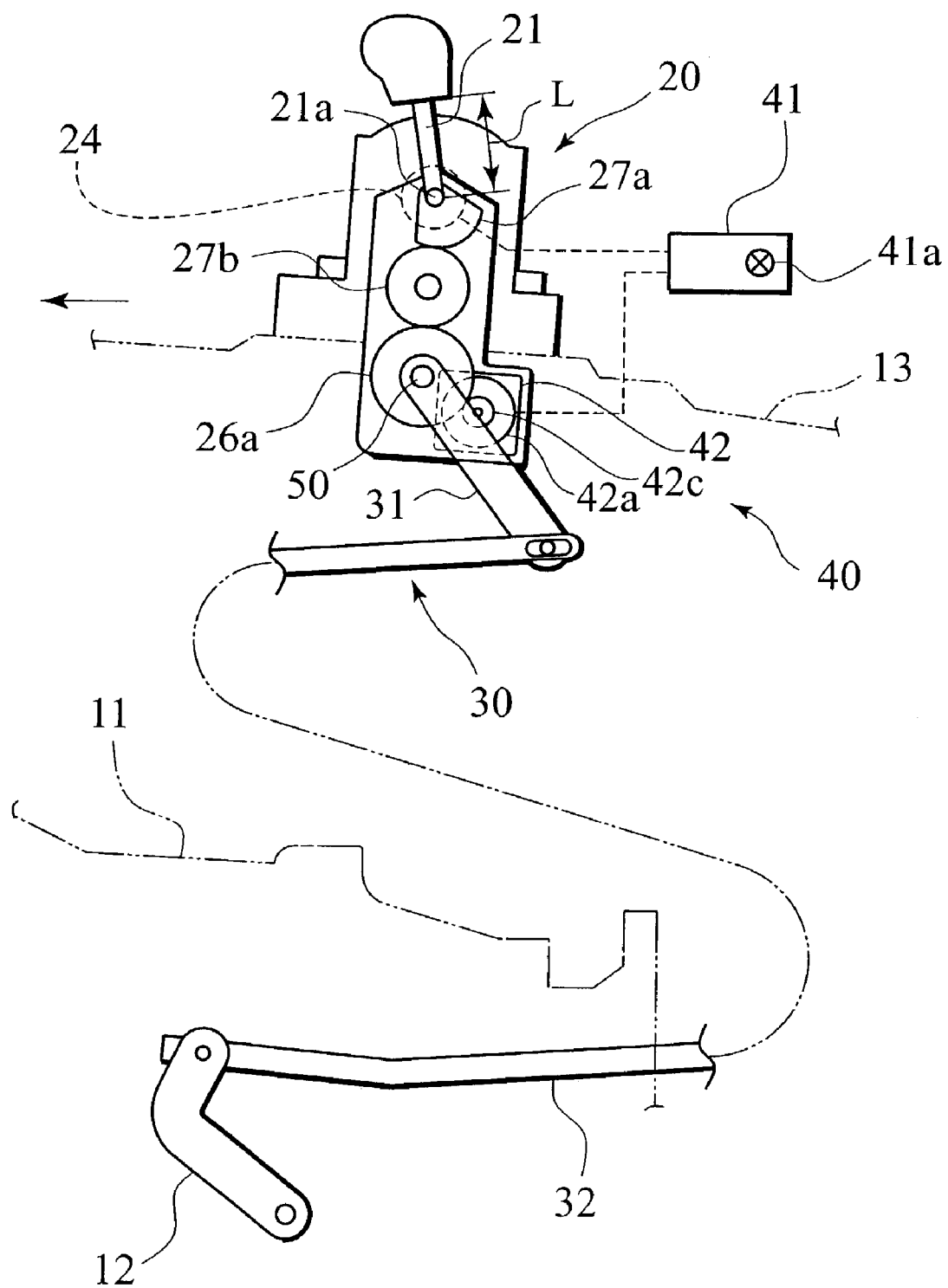
FIG. 12 is a side view of an automatic transmission apparatus in accordance with an eighth embodiment of the invention.

FIG. 11 is a view showing the seventh embodiment of the invention. Also in this embodiment, elements similar to those of the first embodiment are indicated with the same reference numerals, respectively. The seventh embodiment differs from the first embodiment in the shape of a fastening part 23c of the shifting mechanism 20. The other constituents are similar to those of the first embodiment and therefore, their overlapping descriptions are eliminated.

According to this embodiment, the fastening part 23c is provided, on a rear-and-lower face thereof, with a through-hole 23C". Further, a motor casing 45a is arranged to enclose a body of the motor 42a. The motor casing 45a is also provided, on its upper part, with a through-hole 45c which is connected with the through-hole 23c" through a hose 45b.

Consequently, by supplying the motor casing 45a with part of the "air-conditioner" wind directing the rear seat, it is possible to protect the motor 42a from high-temperature environment.

FIGS. 12 to 20 show the eighth embodiment of the invention.

Also in this embodiment, elements similar to those of the first embodiment are indicated with the same reference numerals, respectively and therefore, their overlapping descriptions are eliminated.

In this embodiment, the shift lever 21 has a length L of e.g. 100 mm and is designed to be short and compact in comparison with the common shift lever having a general length, for example, 250 mm. Owing to the adoption of the so-formed shift lever 21, its projecting amount (length) into the vehicle cabin is relatively small to have less influence on the degree of freedom in terms of interior layout of the vehicle cabin. Further, since the shifting mechanism 20 equipped with the shift lever 21 is compact in size, it is also possible to change the position of the mechanism 20 to another place, for example, an appropriate position on an instrumental panel.

As similar to the above-mentioned embodiments, the lower lever 31 has one end fastened to the selector output gear 26a at the connecting part 50 and the other end pivotally connected to one end of the transmission rod 32. The other end of the transmission rod 32 is pivoted to the manual lever 12 connected with the driving-range changing mechanism of the automatic transmission 11.

Figure 13:
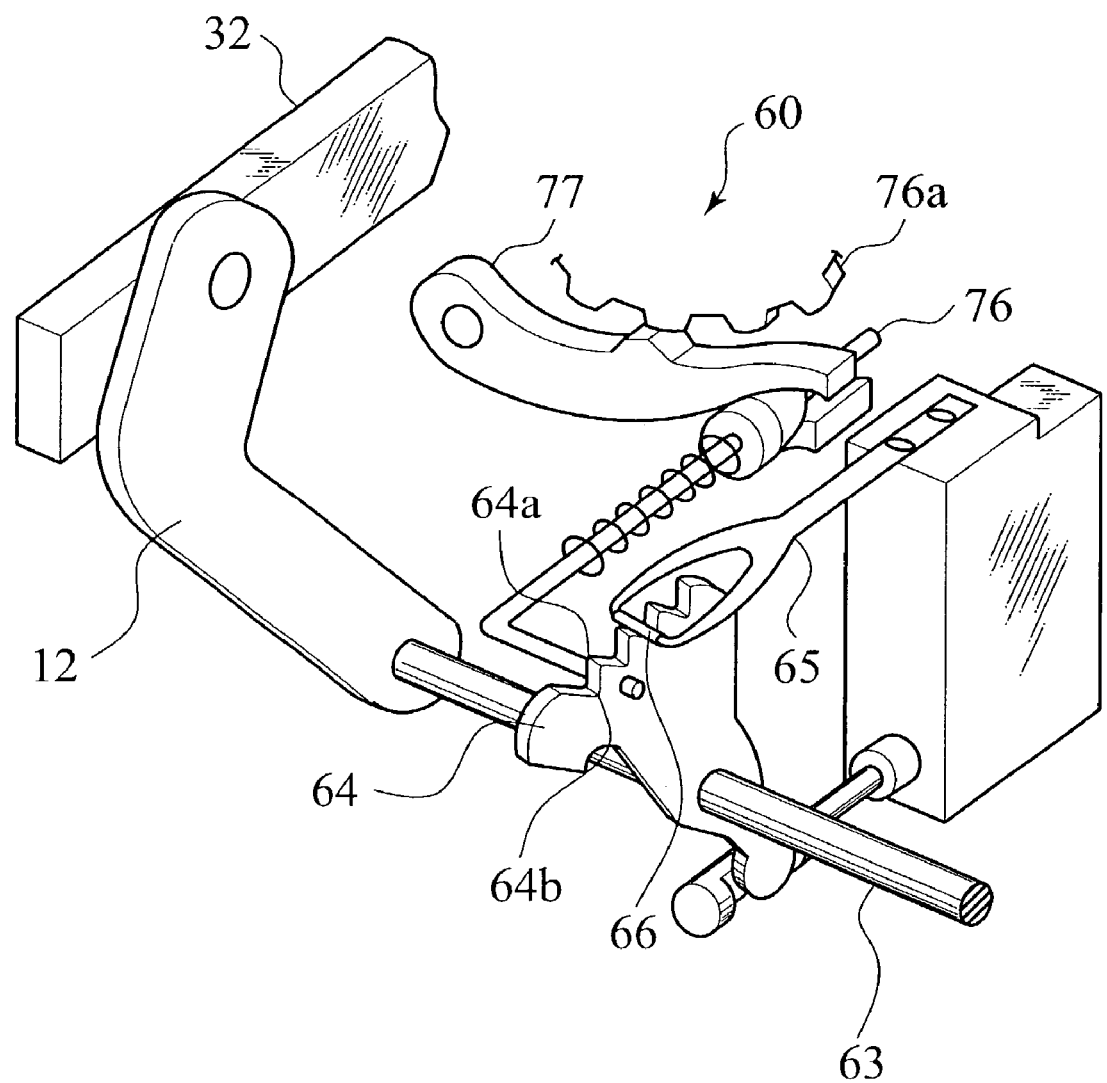
FIG. 13 is a perspective view of a range shifting mechanism of the automatic transmission apparatus of FIG. 12.

FIG. 13 shows the above driving-range changing mechanism 60 on the side of the automatic transmission 11.

The lower end of the manual lever 12 is connected with a rotating shaft 63 carrying a detent plate 64. The detent plate 64 is provided, on its upper part, with roots 64b corresponding to four driving ranges (P, R, N, and D). Each root 64b is defined between adjoining cam peaks 64a. A detent pin 66 at a tip of a plate spring 65 is adapted so as to engage into the roots 64b in order to keep the position of the selected driving range. In brief, a driver's forward-and-backward manipulation on the shift lever 21 is transmitted to the detent plate 64 through the transmission rod 32. The rotational movement of the detent plate 64 causes the detent pin 66 to climb over one cam peak 64a and engage with the adjacent root 64b. Then, the so-accomplished driving range is maintained by an elastic force of the plate spring 65.

It is noted that a force necessary to change one driving range to another driving range is approx. 4 Nm, for example. In case of the common shift lever of 250 mm in length, there is required a manipulating force of 1.6 kgf, producing no problem in manipulating the shift lever. While, in case of the present shift lever of e.g. 100 mm, the manipulating force is elevated up to the order of 4 kgf, which is too large for a driver to manipulate the shift lever. Therefore, according to the present invention, there is provided the manipulating-force assisting device 40, which comprises the sensor part 24, the driving part 42 and the control unit 41.

Figure 14:
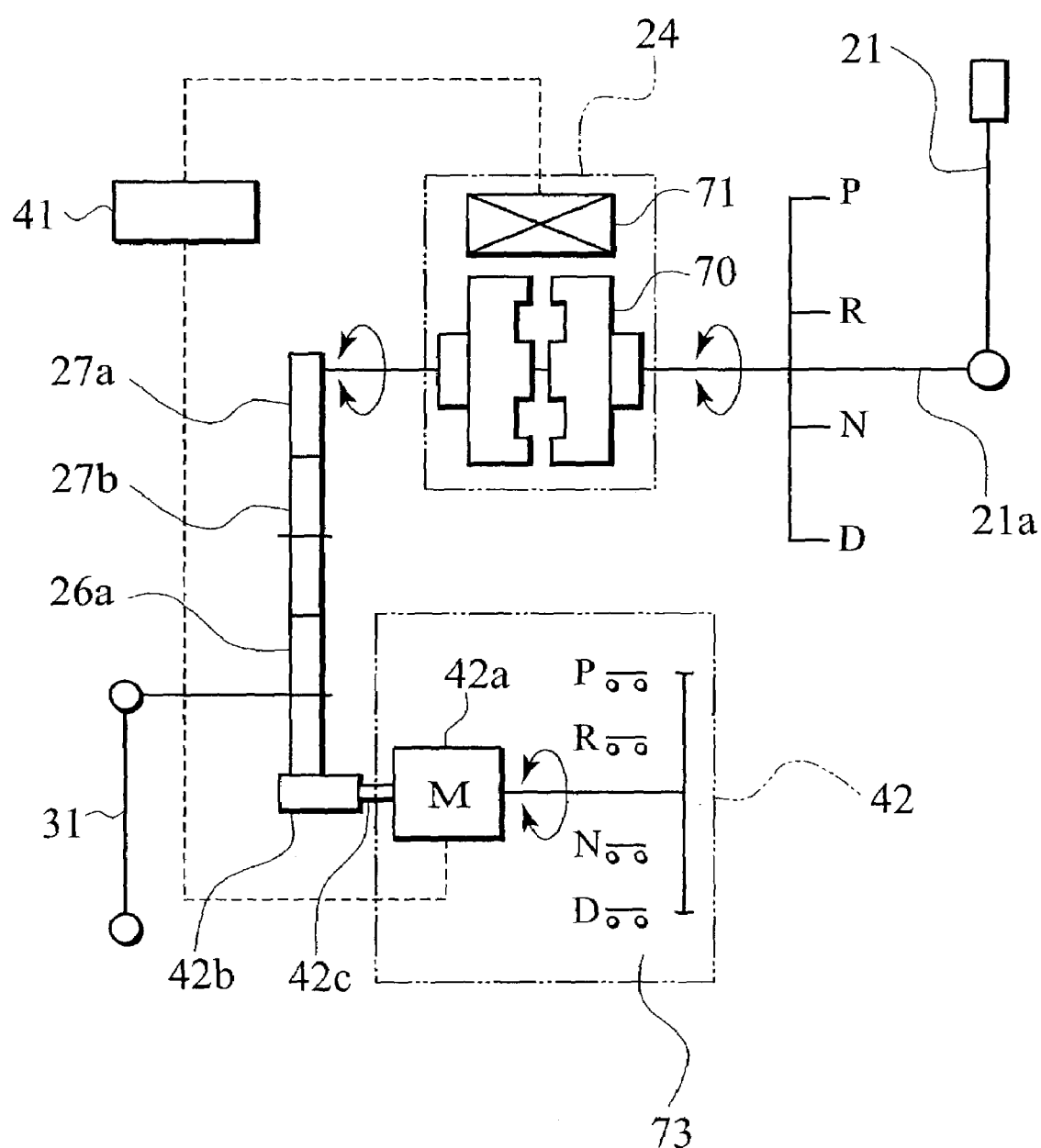
FIG. 14 is a schematic structural view of a control device of the automatic transmission apparatus of FIG. 12.

According to the embodiment, the sensor part 24 is formed by a torque sensor. As shown in FIG. 14, the torque sensor (i.e. the sensor part 24) includes a pair of rotating parts 70 formed on the selector rod 21a and a detecting part 71 for detecting a torsion torque between the rotating parts 70. Since the torque sensor 24 is arranged on the selector rod 21a of the shift lever 21, it is possible to detect an actual torque applied on a driver's hand through the shift lever 21, at a position close to the shift lever 21 precisely. In detail, the torque detected by the torque sensor 24 increases when the detent pin 66 climbs over the cam peak 64a of the detent plate 64.

The driving part 42 is formed by an actuator. The actuator (i.e. the driving part 42) includes an electric motor 42a and an inhibitor switch 73. A gear 42b fixed on a rotating shaft 42aa of the electric motor 42a meshes with the lower gear 26a in the shifting mechanism 20, so that the driving force of the motor 42a can be applied on the lower gear 26a. Noted that the rotating shaft 22a of the electric motor 22 is rotatable freely with no resistance when it is not energized.

The inhibitor switch 73 is formed by a contact switch to be turned on when the driving range is selected. Again, the inhibitor switch 42a is provided to display the so-selected driving range on a display panel and also generate a signal permitting the start of an engine at non-travelling ranges, such as parking range (P) and neutral range (N). Hitherto, the inhibitor switch has been arranged as another component different from the actuator in the common apparatus. While, according to the embodiment, the inhibitor switch 73 is installed in the driving part (actuator) 42. Since there is no need to provide the common inhibitor switch as another component, it is possible to reduce the manufacturing cost of the apparatus.

Figure 15:
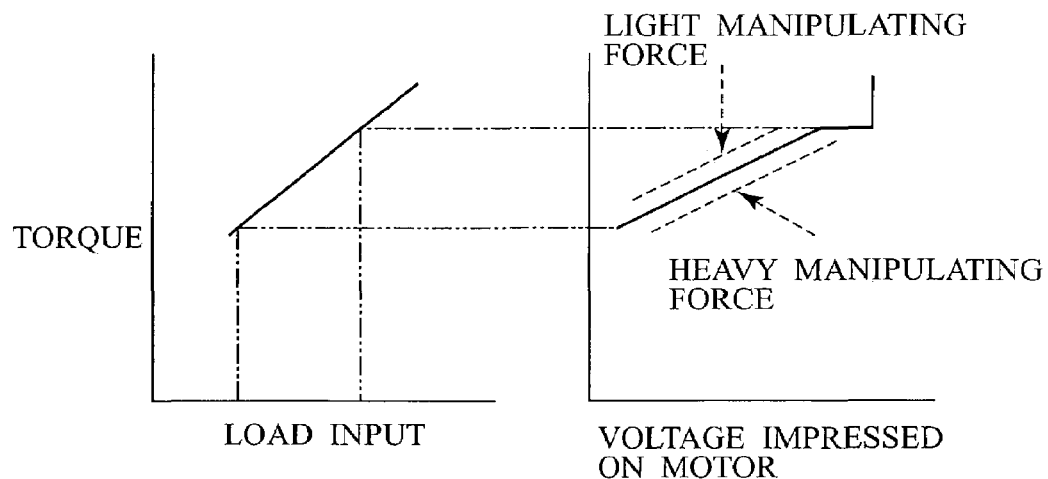
FIG. 15 is a graph showing a relationship between torque and impressed voltage of FIG. 12.

The control unit (amplifier) 41 is arranged between the electric motor 42a and the torque sensor 24 to control a voltage applied on the motor 42a, corresponding to a torque detected by the torque sensor 24. As shown in FIG. 15, if a load of the shift lever 21 increases, then a detected torque is increased. In such a case, the control unit 41 operates to increase a voltage to be applied on the electric motor 42a in accordance with the increased torque, thereby adding a rotating force of the electric motor 42a to a manual manipulating force of the shift lever 21, as an assist force. Therefore, even if shortening the shift lever 21, there is no increase in a force required to manipulate the shift lever 21. In other words, basically, the rotating force of the electric motor 42a supplements all or part of the torque increased by shortening the shift lever 21.

The control unit 41 is provided with a control trimmer (volume) 41a that allows the voltage applied on the electric motor 42a to be adjusted manually. That is, by increasing or decreasing the voltage applied on the motor 42a according to differences between individuals, such as a manipulator's body build, it is possible to adjust a force necessary to manipulate the shift lever 21 to the optimum level.

Figure 16:
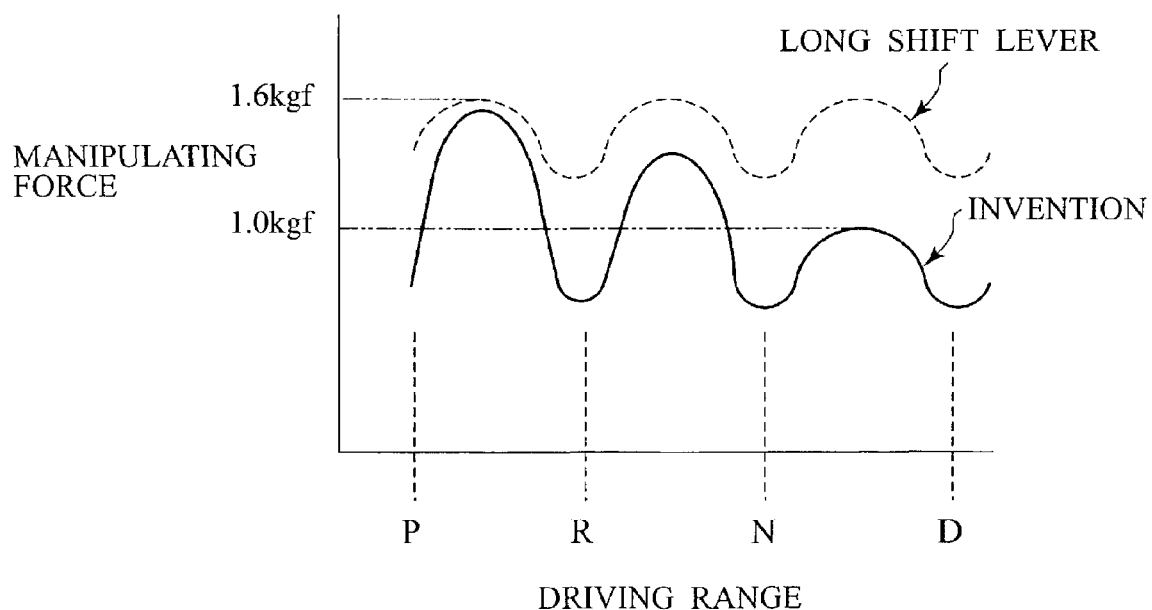
FIG. 16 is a graph showing manipulating forces for every driving range.

According to the embodiment, assist forces by the motor 71 are not identical but different from each other among the driving ranges, providing variations with respect to feeling of manipulation. That is, as shown in FIG. 16, there is established, between the parking range (P) and the reverse range (R), a manipulating force of 1.6 kgf which is similar to that of the common long shift lever in order to prompt a driver's reliable manipulation while allowing the driver to feel a certain measure of resistance from the shift lever 21. Similarly, a manipulating force somewhat smaller than 1.6 kgf is established between the reverse range (R) and the neutral range (N). On the assumption of frequent changes, there is established a manipulating force of 1 kgf or so, between the neutral range (N) and the forward driving range (D). In this way, since the rotating force of the electric motor 42a as the assist force is combined with a driver's manual manipulating force on the shift lever 21 in accordance with its torque in the manipulating direction, the manipulation of the shift lever 21 does not become heavier to improve its operability.

Further, since the motor 42a of this embodiment has a structure allowing free rotation with no resistance when the motor 42a is supplied with no electricity, the manipulating of the shift lever 21 could be insured, heavier though it becomes, even if the apparatus has a trouble, for example, malfunction of a battery, abnormal operation of the control unit 41, etc. This means that there is no need to measure disfunctional operation of the apparatus, bringing significant advantages.

Next, we describe a control method of the control unit 41 employed to enhance the operability of the shift lever 21, in sequence.

Figure 17:
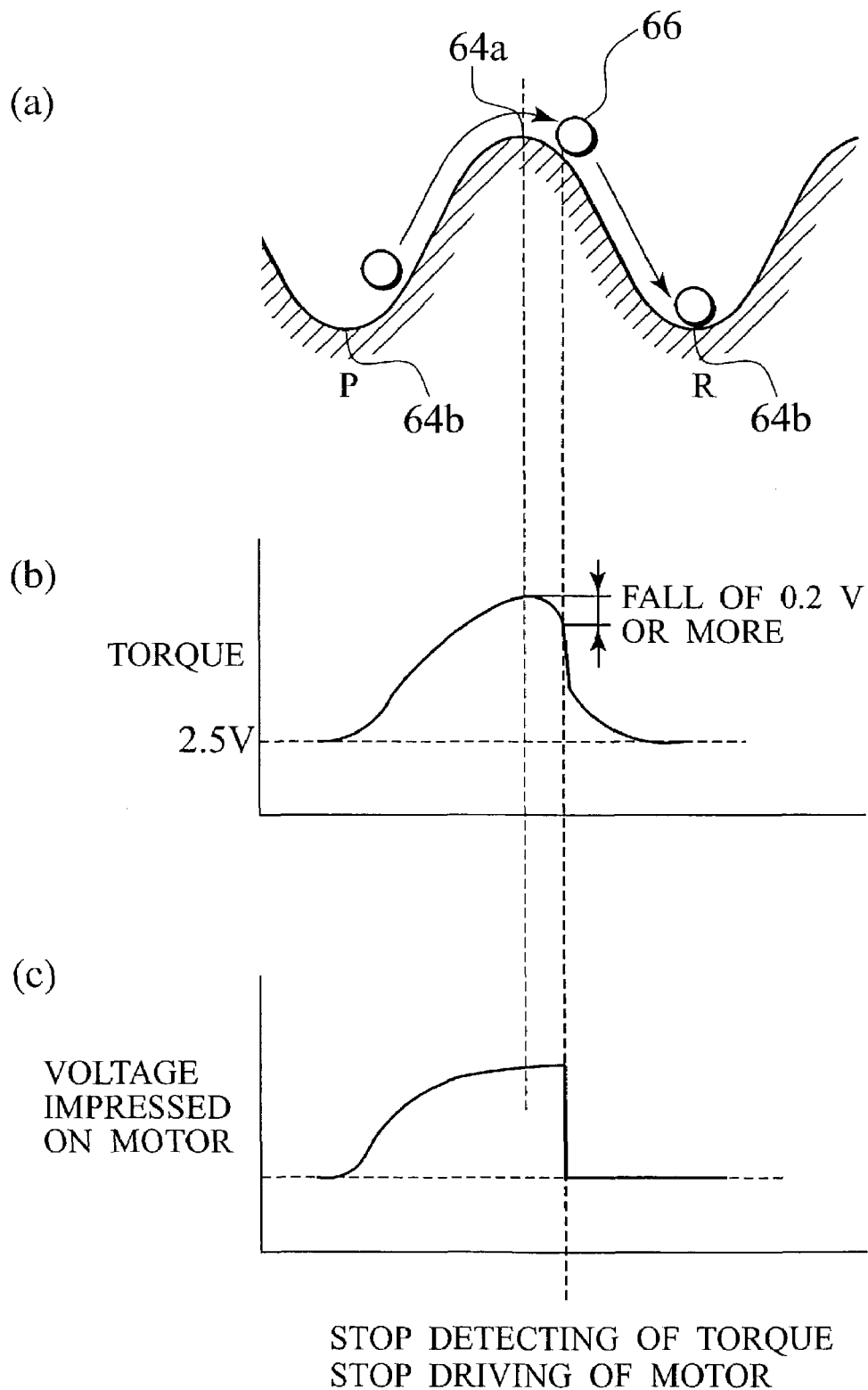
FIG. 17 is a combination diagram explaining an electric-motor stop mechanism in case of detecting a reversing torque.

With reference to FIG. 17, the structure to bring the electric motor to standstill at the detection of reverse torque will be described.

In FIG. 17, a diagram part (a) illustrates a movement of the detent pin 66 that climbs over one cam peak 64a to move from the parking range (P) to the reverse range (R). It is noted that a torque detected by the torque sensor 24 exhibits a characteristic curve similar to the profile of the cam peak 64a. The torque sensor 24 of this embodiment generates a voltage of 2.5V in its neural condition. As shown in a diagram part (b) of FIG. 17, the sensor 24 generates a voltage of 2.5V (as base voltage) even when the sensor 24 does not detect a torque. When the detent pin 66 is climbing on the way to the cam peak 64a, a positive torque is detected in the transmitting direction of the manipulating force. In detail, according to this embodiment, if a situation having a detected torque (dv/dt) more than 3 continues for 15 ns. (nano-second) at least, then it is recognized that such a situation is an action to climb over the cam peak 64a. While the torque sensor 24 is detecting a positive torque, as shown in a diagram part (c) of FIG. 17, a voltage corresponding to the positive torque is impressed on the motor 42a, a necessary assist force is combined with a manual manipulating force of the shift lever 21.

Next, when the position of the detent pin 66 is changed from an uphill for the cam peak 64a to a downhill therefrom, the detent pin 66 is led into the cam groove 64b on the side of the adjacent reverse range (R) by an elastic force of the plate spring 65, so that the torque sensor 24 detects a negative torque in the opposite direction to the transmitting direction of the manipulating force. In this case of the common apparatus, the electric motor would rotate in the opposite direction thereby to exert a brake-feeling with a jerk on the manipulation of the shift lever 21. Therefore, according to this embodiment, when the torque sensor 24 detects a negative torque (i.e. reduction of 0.2 V or more in the reverse direction), it is judged that the above leading (drawing) has started. Then, it is executed to stop both detecting of torque by the torque sensor 24 and rotating of the motor 42a until the inhibitor switch 73 detects the reverse range (R). Accordingly, there is no possibility that the manipulation of the shift lever 21 is accompanied with a brake feeling.

Figure 18:
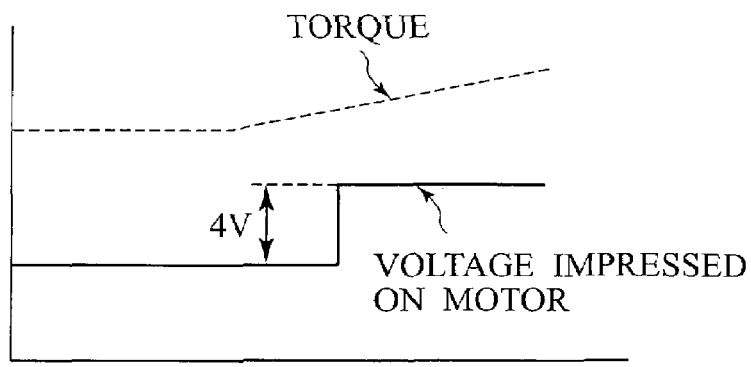
FIG. 18 is a graph explaining a chattering prevention mechanism in case of slow operation.

With reference to FIG. 18, the structure to prevent chattering in manipulating the shift lever slowly is described as follows.

If the shift lever 21 is operated slowly, the rate of rise (rise in load/time) of a torque detected by the torque sensor 24 becomes remarkably slow. In such a case, the assistance by the motor 42a catches up with the detection of a minute torque immediately minor, so that there is the possibility of occurrence of chattering where the electric motor 42a repeats its ON/OFF states.

While, according to the embodiment, if a torque characteristic represented by (dv/dt) is more than 3 and less than 20 [3<(dv/dt)<20], the control unit 41 judges that the shift lever 21 has been manipulated by a driver slowly. Then, it is carried out to impress a constant voltage (4V) on the motor 42a, whereby the occurrence of "ON-and-OFF" chattering can be prevented.

Figure 19:
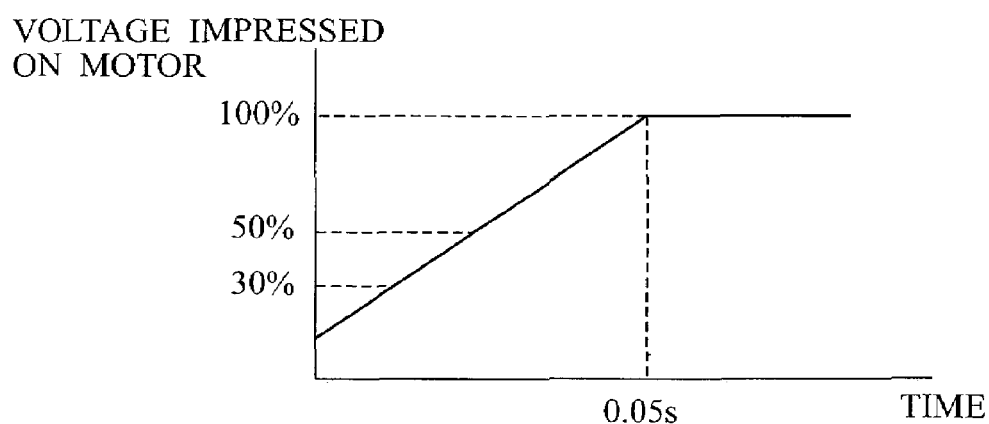
FIG. 19 is a graph explaining an electric-motor sudden stop prevention mechanism at the start of manipulating a shift lever.
Figure 20:
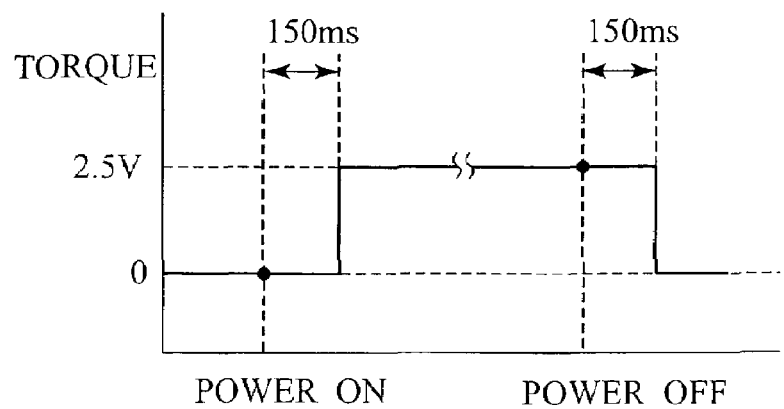
FIG. 20 is a graph explaining an electric-motor glitch prevention mechanism in case of power on/off.

With reference to FIG. 19, the structure to prevent a quick stop of the motor at the start of manipulating the shift lever is described as follows.

Immediately after the start of manipulating the shift lever 21, a value of torque detected by the torque sensor 24 is on the rise and therefore, there is required a small torque. Thus, there is the possibility that the assist operation of the electric motor 42a immediately catches up with the required torque to cause a sudden stop, thereby deteriorating the driver's feeling of manipulation.

Therefore, according to the embodiment, when starting the manipulation of the shift lever 21 from the respective driving ranges, it is executed to rise an applied voltage on the electric motor 42a not abruptly but gradually. Consequently, since the assisting force by the motor 42a is reduced at first, there is no possibility that the assist operation of the electric motor 42a immediately catches up with the required torque to cause a sudden stop.

With reference to FIG. 19, the structure to prevent a glitch of the motor when the torque sensor is powered ON or OFF is described as follows.

When the power of 12V for the torque sensor 24 is on, a period of 130 ms is required for the torque sensor 24 to generate an initial value of 2.5 V that can provide the stable rising characteristic of the sensor. If the control unit 41 rises up before the initial rise of the torque sensor 24, it is feared that the unit 41 misinterprets the sensor 24 as detecting a negative torque to command the motor 42a to backlash. Additionally, even when the power of 12V for the torque sensor 24 is off, there still remains the possibility that the unit 41 commands the motor 42a to backlash so long as the unit 41 is controllable while the output of the torque sensor 24 is falling from 2.5 V, as well.

According to the embodiment, when the apparatus is adapted to start all the operations by manipulation of an ignition switch, the reading operation of the torque sensor 24 is prohibited from reading a torque for a period from the power-ON by manipulating the ignition till a lapse of 150 ms. That is, since a time required for the torque sensor 24 to rise perfectly is 130 ms, the torque sensor 24 has already raised itself up at the beginning of reading a torque, whereby the glitch of the electric motor 42a can be prevented.

When the power of 12V for the torque sensor 24 is off, the activating period of the torque sensor 24 is prolonged for 150 ms. That is, the torque sensor 24 is powered off after the motor 42a has been powered off and therefore, it is possible to prevent the glitch of the electric motor 42a.

Figure 21:
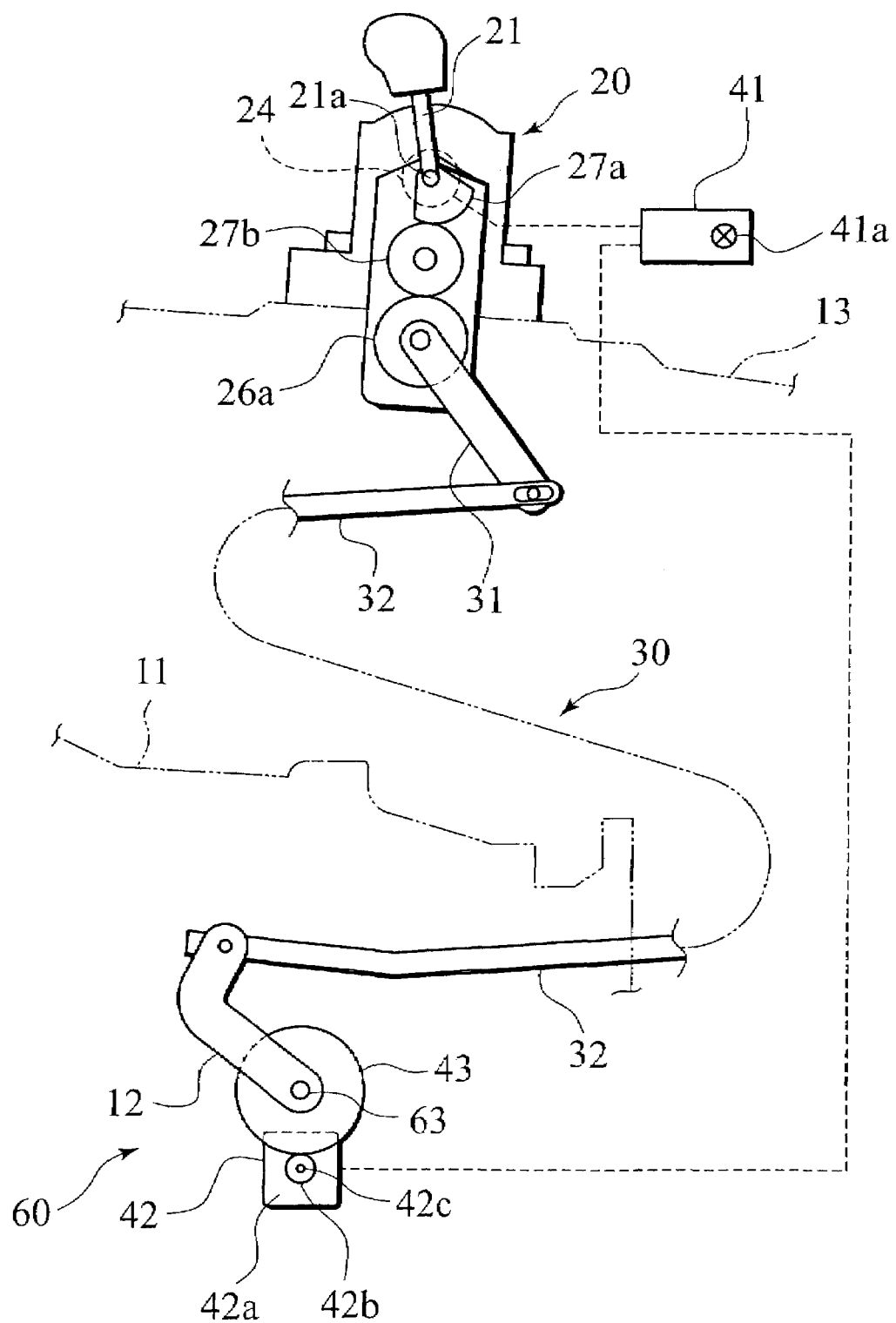
FIG. 21 is a side view of an automatic transmission apparatus in accordance with a ninth embodiment of the invention.

FIG. 21 shows the ninth embodiment of the invention. According to this embodiment, the driving part 18 in the form of an actuator is arranged on the side of the driving-range changing mechanism 60. A gear 43 is fixed to the rotating shaft 63 secured to the manual lever 12 and is engaged with the gear 42b on the rotating shaft 42c of the motor 42. With this arrangement, the assisting force produced by the motor 42a acts on the driving-range changing mechanism 60 and also the automatic transmission 11 and does not act on the transmission rod 32. Therefore, it is possible to improve the durability of the transmission rod 32.

Figure 22:
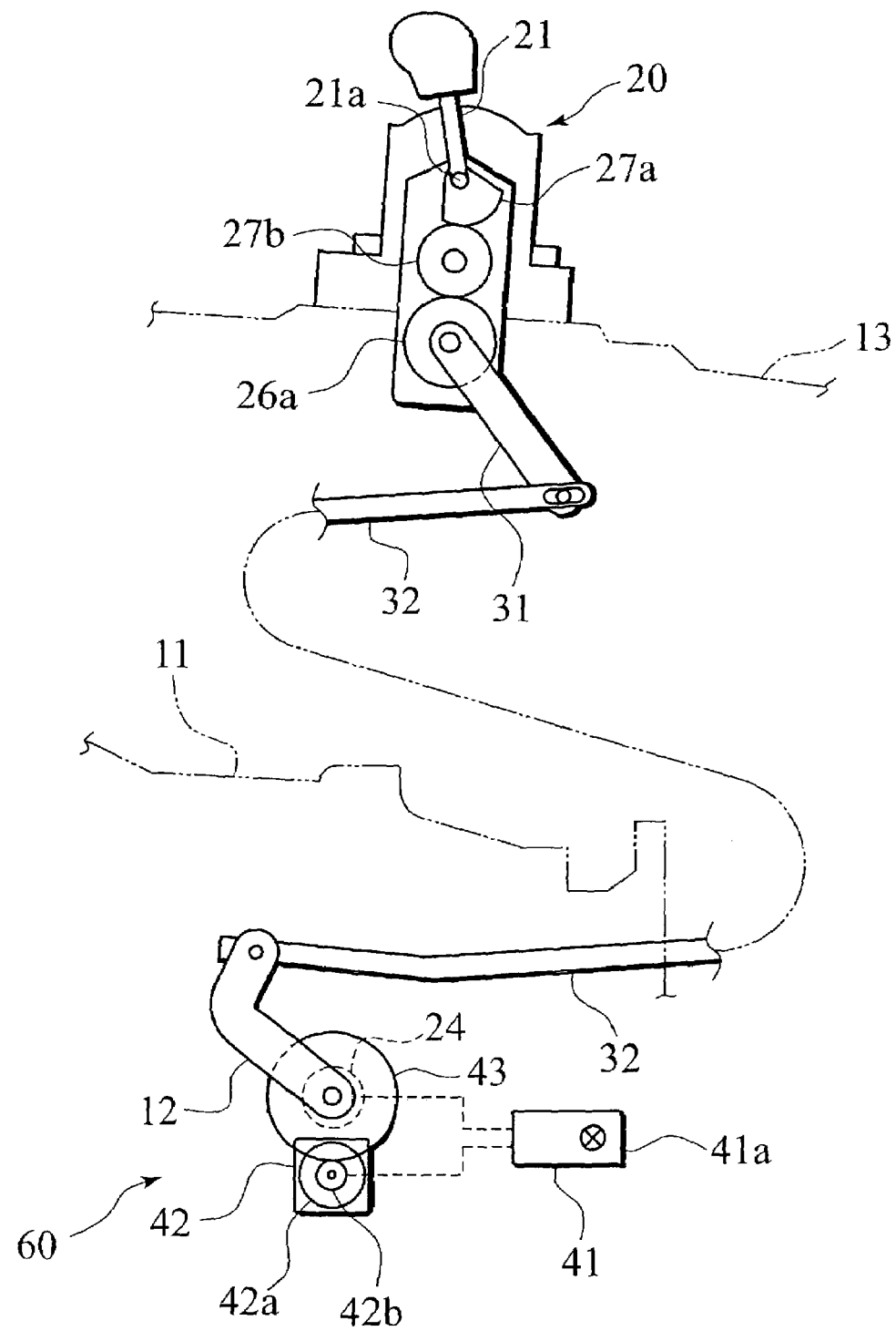
FIG. 22 is a side view of an automatic transmission apparatus in accordance with a tenth embodiment of the invention.

FIG. 22 shows the tenth embodiment of the invention. According to this embodiment, not only the driving part 18 but also the torque sensor 24 is arranged on the side of the driving-range changing mechanism 60. This arrangement would be suitable in a situation such that the shifting mechanism 20 and its circumference could not provide spaces for the torque sensor 24 and the driving part 18.

Figure 23:
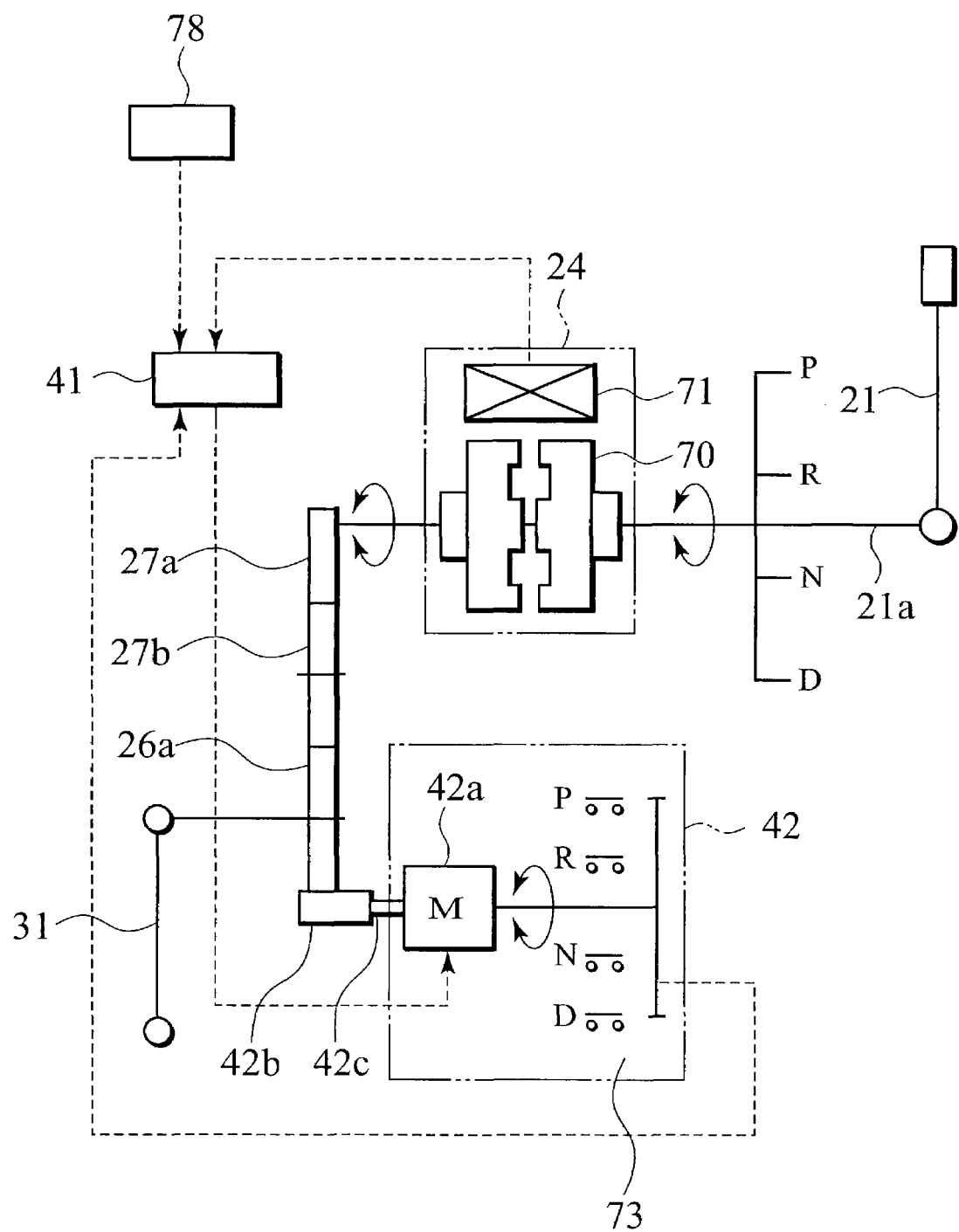
FIG. 23 is a schematic structural view of a control device of an automatic transmission apparatus in accordance with an eleventh embodiment of the invention.
Figure 24A:
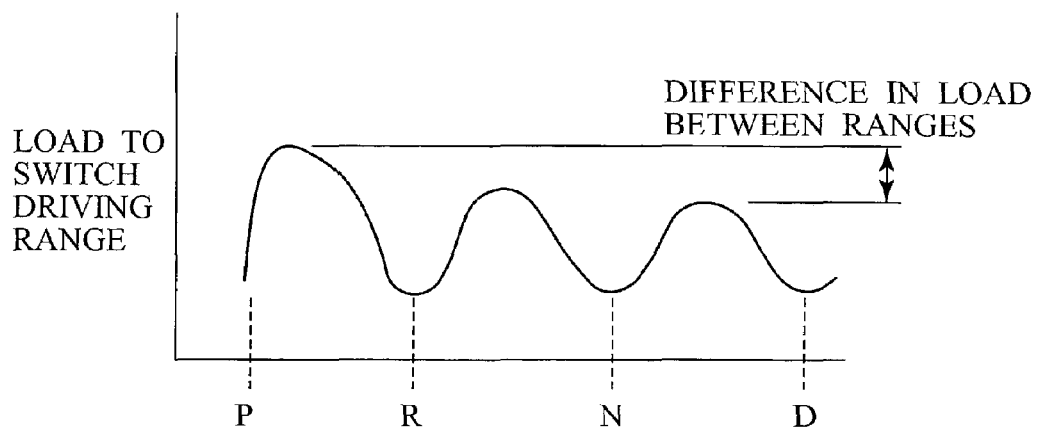
FIG. 24A is a graph showing torques necessary for changing driving ranges and FIG. 24B is a graph also showing a torque necessary for shifting a driving range from a parking range corresponding to a road gradient.

FIG. 23 shows the eleventh embodiment of the invention. According to this embodiment, a plurality of assist-torque maps are installed in the control unit 41 in order to control the operation of the electric motor 42a. As shown in FIG. 24A, it is noted that driving-range change torques required in changing one driving range to the other one are different from each other for every driving ranges. This is because loads generated in changing a gear-engagement in the driving-range changing mechanism 60 are different from each other for every driving ranges, besides loads produced when the detent pin 66 climbs over the cam peak 64a of the detent plate 64.

Figure 24B:
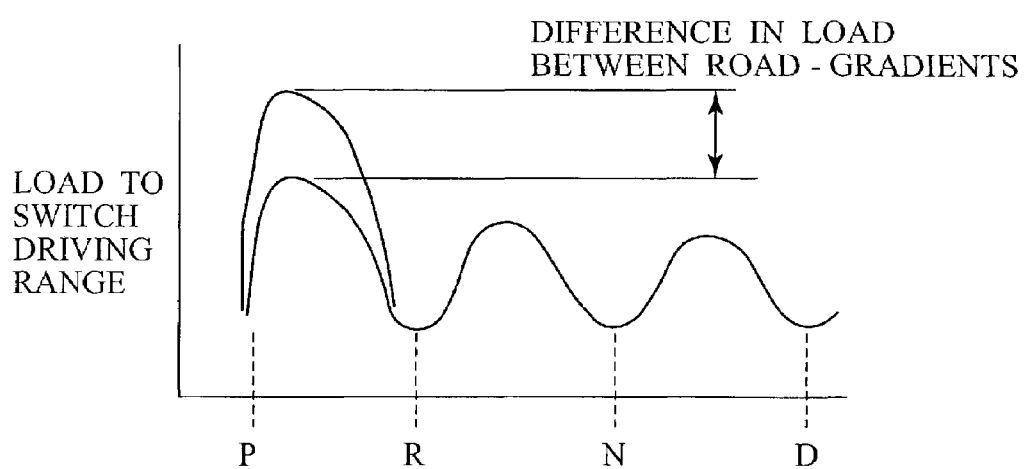

While, as shown in FIG. 24B, the driving-range changing torque necessary to shift the shift lever 21 from the parking range (P) to the reverse range (R) changes by whether the vehicle at the parking range (P) has been parked on a flat road or gradient road. The driving-range changing torque further changes corresponding to a slope of the gradient road.

The reason why the driving-range changing torque changes corresponding to a slope of the gradient road is as follows. As shown in FIG. 13, at the parking range (P), a parking pole 76 interrupts the rotation of a parking gear 76a through a cam plate 77 to lock up driving wheels (not shown).

Therefore, when the vehicle is parked at the parking range (P) on a gradient road, the load of a vehicle weight is applied on the cam plate 77 so as to lock up the driving wheels corresponding to a slope of the gradient road, thereby functioning as a force engaging the parking pole 76.

Thus, regarding the driving-range changing torque that is necessary to change the parking range (P) to the other driving range, the same torque in case of parking the vehicle on the gradient road becomes larger than that in case of parking the vehicle on the flat road, requiring a driver's large force to manipulate the shift lever 21.

Figure 25:
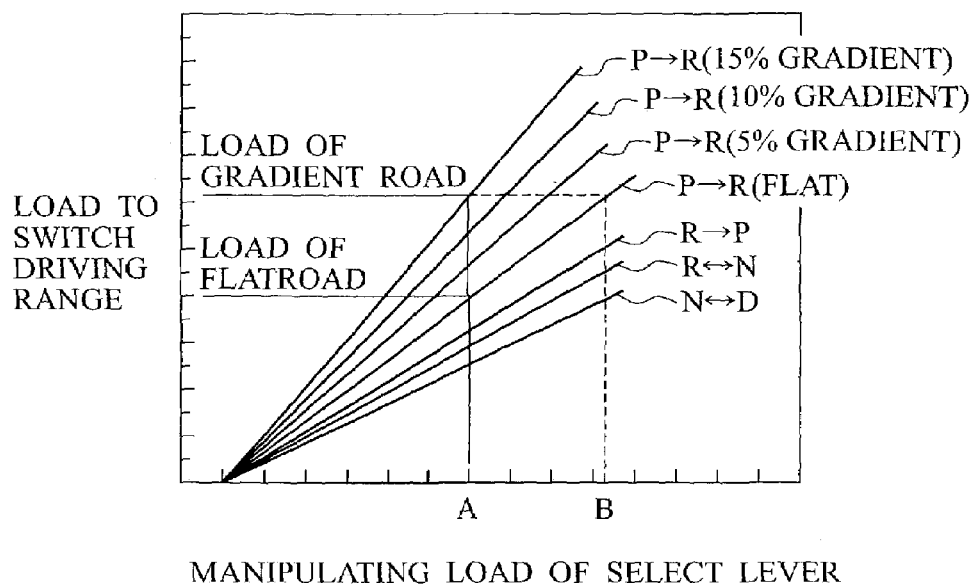
FIG. 25 is a graph showing an assist torque map for calculation of an assist force.

According to the embodiment, as shown in FIG. 25, the control unit 41 is provided, between the adjoining driving ranges, with an assist torque map to reduce a manipulating force for the shift lever 21 to a designated manipulating force. Further, the unit 41 is provided, corresponding to a gradient of the vehicle, with an additional assist torque map to reduce a manipulating force, which is required for the shift lever 21 to change its position from the parking range (P) to the other driving range, to a designated manipulating force.

For example, when parking the vehicle on the flat road, a load A of FIG. 25 is applied on the shift lever 21 to change its position from the parking range (P) to the other driving range. While, in case of a gradient road of 15%, a load B (FIG. 21) is applied to the shift lever 21. Therefore, a line of "PER (15% gradient)" is selected from the assist torque map to generate an assisting force, whereby the shift lever 21 can be operated with a load similar to that in case of parking the vehicle on a flat road.

Figure 26:
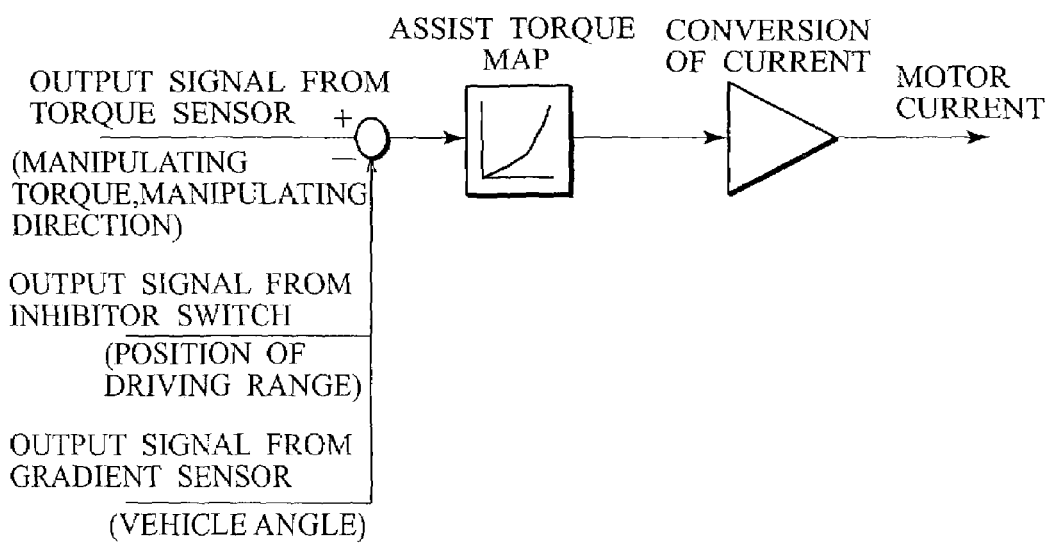
FIG. 26 is a block diagram showing a control flow of a control amplifier for generating the assist force.

Referring to FIG. 26, the control sequence (blocks) of the control unit 41 to reduce the manipulating force for the shift lever 21 will be described in order.

As shown in FIG. 26, it is performed to input both a range-position signal generated from the inhibitor switch 73 and a road-gradient signal generated from a gradient sensor 78, into the control unit 41. Then, the present position of the shift lever 21 and its manipulating direction are detected by a torque signal generated from the torque sensor 24 in manipulating the shift lever 21. Corresponding to the so-detected range position and manipulating direction of the shift lever 21, it is carried out to select an appropriate assist torque map from a plurality of assist torque maps in FIG. 25.

Next, by using the selected assist torque map, it is carried out to calculate an assisting force in charge of the driving part (actuator) 42, corresponding to the above torque signal.

Next, a designated current corresponding to the so-calculated assisting force is generated from the control unit 41 to the driving part 42 thereby producing the above assisting force.

Now, when the shift lever 21 is at the parking range (P), it is carried out to calculate a road gradient by the road-gradient signal and further select an appropriate map from the assist torque maps for the parking range (P). If there is no appropriate assist torque map at the a gradient sensor 78, then two assist torque maps above and below the calculated road gradient are selected for supplement to calculate an assist force in charge of the driving part 42 in accordance with the torque signal.

In summary, according to the embodiment, by altering the assist torque map to an appropriate one, it is possible to optionally establish a manipulating force in manipulating the shift lever 21 from each driving range and a manipulating force in manipulating the shift lever 21 to each driving range, corresponding to the position of the shift lever 21 and its manipulating direction.

Additionally, by altering the assist torque map to an appropriate one, it is possible to optionally establish a manipulating force in manipulating the shift lever 21 from the parking range (P), corresponding to an inclination angle of the vehicle parking on the gradient road.

Noted that although the assisting force generated by the driving part 42 is controlled since the control unit 41 alters a current value flowing the motor 42a in the above-mentioned embodiment, of course, a voltage impressed on the motor 42a instead of the current may be altered to control the assisting force in the modification.

Further, by establishing the assisting forces generated by the driving part 42 properly, it is possible to unify respective manipulating forces each between the adjoining driving ranges or differentiate these forces from each other.

Again, although the assist torque maps each having an assist torque changeable linearly in accordance with a load are employed in the above mentioned embodiment, there can be used assist torque maps each resulting by adding a constant value to an assist torque map for the flat road corresponding to a road gradient. Alternatively, it is possible to use a map obtained by experimental values.

Further, the above motor 42b may be replaced with an electric motor having an established output torque. Alternatively, the control unit 41 may be provided, in its circuit, with a fuse. Then, even if an excess current flows the motor without discretion, it is possible to prevent the shift lever 21 from being shifted against a driver's will due to an assisting force generated by the drive part 42.

Figure 27:
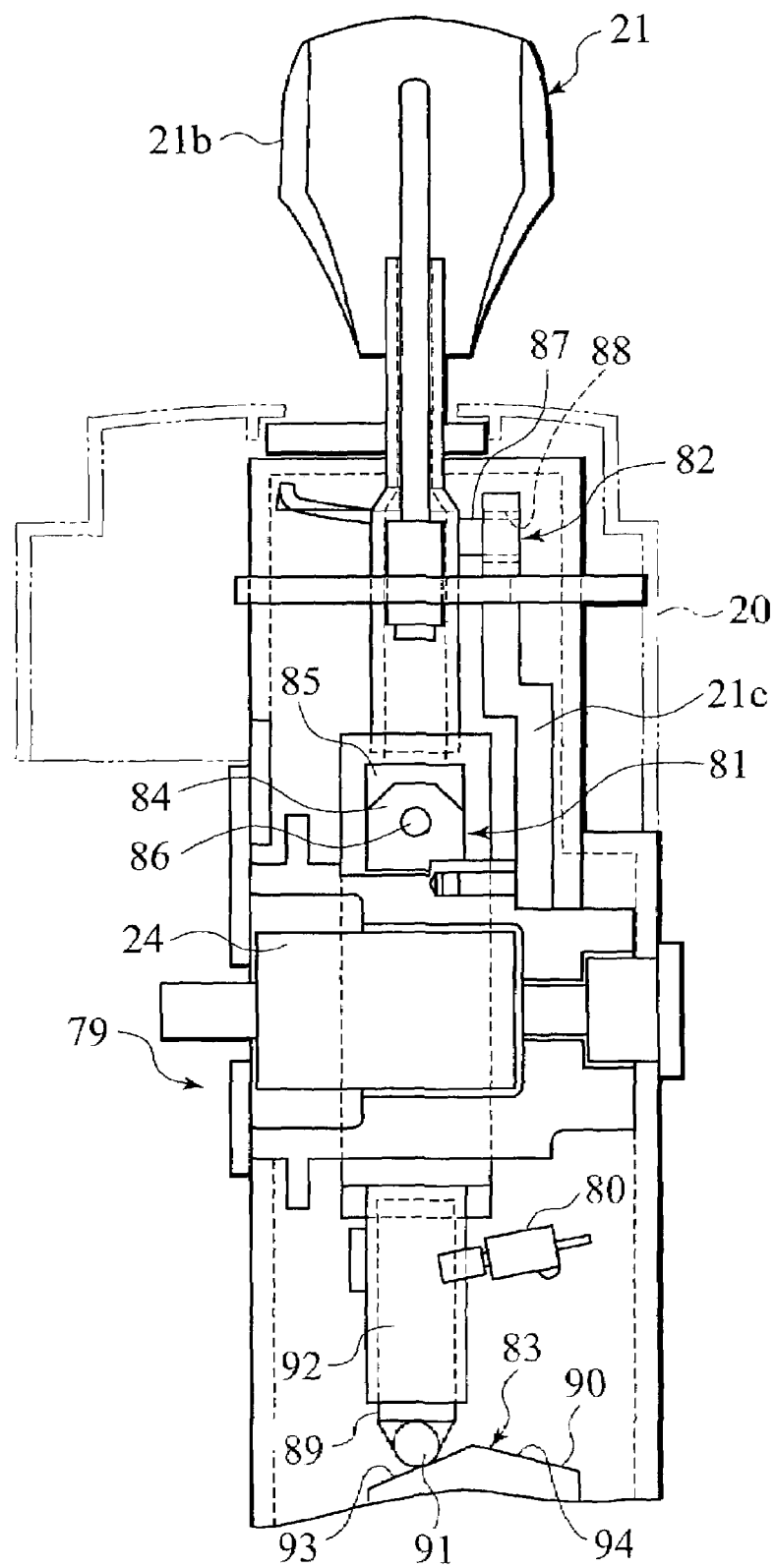
FIG. 27 is a schematic view showing a shift lever in an automatic shifting mode of an automatic transmission apparatus in accordance with a twelfth embodiment of the invention.
Figure 28:
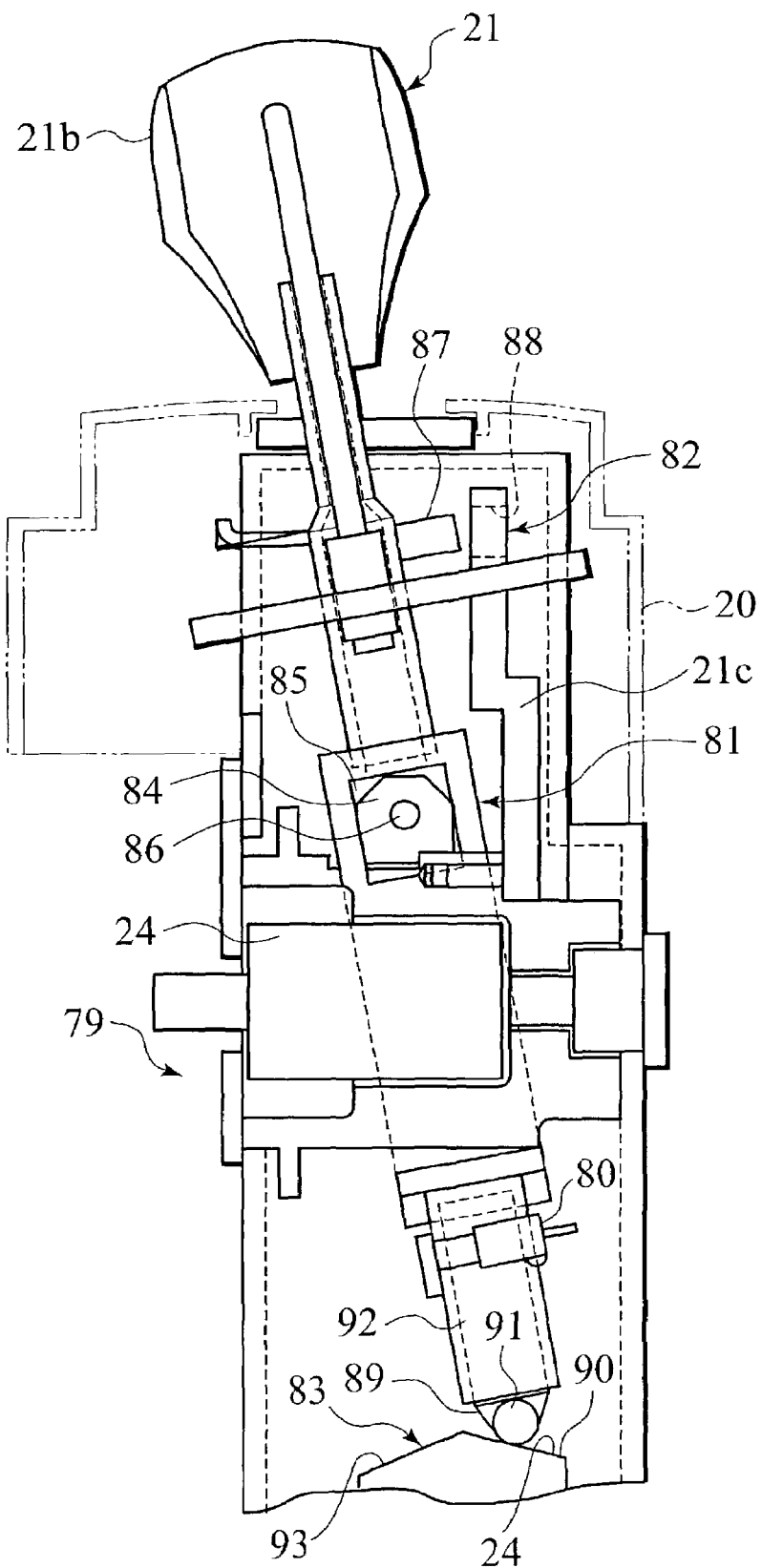
FIG. 28 is a schematic view showing a shift lever in a manual shifting mode of an automatic transmission apparatus in accordance with a twelfth embodiment of the invention.

FIGS. 27 and 28 show the twelfth embodiment of the invention. According to the embodiment, an automatic transmission apparatus is provided with a forward driving range (D) including a manual transmission mode allowing an optional gear-speed to be selected and an automatic transmission mode to attain a predetermined gear-speed corresponding to the travelling condition of the vehicle.

The automatic transmission apparatus of the embodiment includes a mode switching mechanism 79 to switch the operation of the apparatus between the manual transmission mode and the automatic transmission mode and a "manual transmission mode" detecting unit 80 to detect the apparatus in the manual transmission mode.

The shift lever 21 is formed by a manipulating lever part 21b and a shift lever part 21c.

In the automatic transmission mode, as shown in FIG. 27, the manipulating lever part 21b is joined to the shift lever part 21c. When the automatic transmission apparatus is in the automatic transmission mode, the manipulating lever part 21b is maintained in its upright posture (i.e. automatic transmitting position) in view of the apparatus in a fore-and-aft direction of the vehicle. In this state, one driving range is changed to the other driving range.

In the manual transmission mode, as shown in FIG. 28, the manipulating lever part 21b is inclined in view of the apparatus in the fore-and-aft direction of the vehicle and maintained in its manual transmitting position. In this state, one gear-speed is changed to the other gear-speed.

The mode switching mechanism 79 is formed by a swing support 81 for pivotally supporting the manipulating lever part 21b, a clutch 82 for connecting the lever part 21b with the shift lever part 21c certainly and a cam part 83 for holding the lever part 21b at either the automatic transmitting position or the manual transmitting position.

In the swing support 81, a sensor-side connecting part 84 in one body with the torque sensor 24 is pivotally connected with a lever-side connecting part 85 in one body with the manipulating lever part 21b, through a round bar pin 86.

In the clutch 82, by engaging an engagement projection 87 on the lever part 21b into an engagement hole 88 formed in the shift lever part 21c, the lever part 21b is connected with the shift lever part 21c when the automatic transmission apparatus is in the automatic transmitting mode and when changing one driving range to the other driving range, thereby preventing a saccadic movement between the lever part 21b and the lever part 21c.

The cam part 83 is formed by a ball spring 89 attached to the lower end of the manipulating lever part 21*b* and a cam top 90. At the tip of the ball spring 89, a ball part 91 is urged against the cam top 90 by a spring 92. Under such an urging condition, the manipulating lever part 21*b* is supported on either a slanted face 93 on the side of the automatic transmission or another slanted face 94 on the side of the manual transmission.

In order to switch the transmission mode (between the automatic transmission mode and the manual transmission mode), the ball part 91 has to climb over a peak of the cam top 90 while repelling a force of the spring 92. Therefore, the manipulating lever part 21*b* is maintained in either the automatic transmission mode or the manual transmission mode stably.

In order to detect the automatic transmission apparatus in the manual transmission mode, a mode switch 80 is arranged in the vicinity of the lower end of the manipulating lever part 21*b*. In operation, the switch 80 is switched ON when the apparatus is in the automatic transmission mode. The switch 80 is switched OFF when the apparatus is in the manual transmission mode.

Consequently, when the mode switch 80 detects the apparatus being in the manual transmission mode, an assisting force is not produced by the driving part (actuator). That is, it is possible to prevent the glitch of the driving part.

Finally, it will be understood by those skilled in the art that the foregoing descriptions are nothing but some embodiments of the disclosed automatic transmission apparatus for a vehicle. Besides these embodiments, various changes and modifications may be made to the present invention without departing from the spirit and scope of the invention.

Japanese Patent Applications No. 2001-339776 (filed on Nov. 5, 2001), No. 2002-33037 (filed on Feb. 8, 2002) and No. 2002-167371 (filed on Jun. 7, 2002) are expressly incorporated herein by reference in its entirety.

The scope of the invention is defined with reference to the following claims.

What is claimed is:

1. An automatic transmission apparatus for a vehicle, comprising:

- an automatic transmission that has a driving-range changing mechanism;
- a shifting mechanism that has a shift lever to be manipulated by a driver, the shifting mechanism being adapted to allow a driving range of the vehicle to be selected by the driver's manipulation of the shift lever;
- a link mechanism for transmitting a movement of the shift lever to the driving-range changing mechanism; and
- a manipulating-force assisting device that is configured to assist a driver's force to manipulate the shift lever by acting on a connecting part between the shifting mechanism and the link mechanism,
- wherein the manipulating-force assisting device includes a motor as a driving source.

2. The automatic transmission apparatus of claim 1, wherein the shifting mechanism includes a selector casing for accommodating a part of the shift lever therein, and wherein the selector casing is provided with a fastening part in the form of a through-pipe that extends in a fore-and-aft direction of the vehicle.

3. The automatic transmission apparatus of claim 1, wherein the manipulating-force assisting device further includes:

- a sensor part that is arranged in the shifting mechanism and that is configured to detect information about the shift lever; and
- a control unit that is arranged in a vehicle cabin and that is configured to generate a drive signal to the motor on the basis of the information detected by the sensor part.

4. The automatic transmission apparatus of claim 1, wherein the shifting mechanism has an output part associated with the manipulating-force assisting device, and wherein the driver's force to manipulate the shift lever is transmitted to the output part through a belt.

5. The automatic transmission apparatus of claim 1, wherein the shifting mechanism has an output part associated with the manipulating-force assisting device, and wherein the driver's force to manipulate the shift lever is transmitted to the output part through a rod.

* * * * *